US012218409B2

(12) United States Patent
Kim et al.

(10) Patent No.: US 12,218,409 B2
(45) Date of Patent: Feb. 4, 2025

(54) ELECTRONIC DEVICE INCLUDING AN ANTENNA

(71) Applicant: Samsung Electronics Co., Ltd., Suwon-si (KR)

(72) Inventors: Taegyu Kim, Suwon-si (KR); Jesun Moon, Suwon-si (KR); Kyungbae Ko, Suwon-si (KR); Hanbin Lee, Suwon-si (KR); Donghwan Kim, Suwon-si (KR); Jinwoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 17/752,170

(22) Filed: May 24, 2022

(65) Prior Publication Data

US 2022/0336944 A1 Oct. 20, 2022

Related U.S. Application Data

(63) Continuation of application No. PCT/KR2022/005421, filed on Apr. 14, 2022.

(30) Foreign Application Priority Data

Apr. 14, 2021 (KR) ........................ 10-2021-0048817
Sep. 14, 2021 (KR) ........................ 10-2021-0122728

(51) Int. Cl.
*H01Q 1/24* (2006.01)
*H01Q 1/02* (2006.01)
(Continued)

(52) U.S. Cl.
CPC ............... *H01Q 1/243* (2013.01); *H01Q 1/02* (2013.01); *H01Q 1/48* (2013.01); *H01Q 1/526* (2013.01); *H01Q 5/307* (2015.01); *H01Q 7/00* (2013.01)

(58) Field of Classification Search
CPC ........ H01Q 1/02; H01Q 1/243; H05K 9/0081; H05K 9/0075; H05K 9/0088;
(Continued)

(56) References Cited

U.S. PATENT DOCUMENTS 6,927,737 B2 8/2005 Inoue
10,141,625 B1 * 11/2018 Ryu .................... H01Q 1/2291
(Continued)

FOREIGN PATENT DOCUMENTS

CN 108075231 A 5/2018
CN 212968028 U 4/2021
(Continued)

OTHER PUBLICATIONS

International Search Report and Written Opinion dated Jul. 28, 2022, issued in International Patent Application No. PCT/KR2022/005421.
(Continued)

*Primary Examiner* — Ricardo I Magallanes
*Assistant Examiner* — Aladdin Abdulbaki
(74) *Attorney, Agent, or Firm* — Jefferson IP Law, LLP

(57) ABSTRACT

An electronic device is provided. The electronic device includes a housing having a front surface and a rear surface, a first antenna, a second antenna, a printed circuit board, and an electromagnetic interference (EMI) shielding sheet. The first antenna may be disposed inside the housing. The second antenna may be disposed in an area surrounded by a radiator of the first antenna when viewed from above the rear surface. The printed circuit board may include a wireless communication module for operating the first antenna and the second antenna, and may be electrically connected to the first antenna and the second antenna. The first antenna may be positioned between the rear surface and the EMI shielding sheet.

19 Claims, 17 Drawing Sheets

(51) Int. Cl.
*H01Q 1/48* (2006.01)
*H01Q 1/52* (2006.01)
*H01Q 5/307* (2015.01)
*H01Q 7/00* (2006.01)

(58) Field of Classification Search
CPC ............. H05K 2201/066; H05K 7/205; H05K 7/2039; H05K 7/20154; H05K 7/20254; H05K 7/20263; H05K 3/0061; H05K 1/0201; H05K 1/0203; H05K 2201/10416
See application file for complete search history.

(56) References Cited

U.S. PATENT DOCUMENTS

| | | | | |
|---|---|---|---|---|
| 2003/0189519 | A1 | 10/2003 | Rutfors et al. | |
| 2005/0104789 | A1 | 5/2005 | Hashidate et al. | |
| 2010/0134362 | A1 | 6/2010 | Takasu | |
| 2013/0267170 | A1 | 10/2013 | Chong et al. | |
| 2014/0342670 | A1 | 11/2014 | Kang et al. | |
| 2016/0063232 | A1 | 3/2016 | Seol et al. | |
| 2017/0110788 | A1* | 4/2017 | Mai | H01Q 1/521 |
| 2017/0288298 | A1* | 10/2017 | Kim | G06F 1/1635 |
| 2018/0026326 | A1* | 1/2018 | Noh | H01Q 7/00 343/904 |
| 2019/0051967 | A1* | 2/2019 | Ryu | H05K 1/028 |
| 2019/0363584 | A1 | 11/2019 | Leem | |
| 2021/0021055 | A1 | 1/2021 | Kim et al. | |
| 2024/0250401 | A1* | 7/2024 | Shigematsu | H01Q 1/22 |

FOREIGN PATENT DOCUMENTS

| | | | | | |
|---|---|---|---|---|---|
| KR | 10-2014-0109649 | A | | 9/2014 | |
| KR | 20140109649 | A | * | 9/2014 | H01Q 1/2208 |
| KR | 10-1580518 | B1 | | 12/2015 | |
| KR | 10-2016-0093127 | A | | 8/2016 | |
| KR | 20180056120 | A | * | 11/2016 | H01G 9/16 |
| KR | 10-2017-0017416 | A | | 2/2017 | |
| KR | 20170017416 | A | * | 2/2017 | H01Q 5/307 |
| KR | 10-2017-0112508 | A | | 10/2017 | |
| KR | 10-2018-0057939 | A | | 5/2018 | |
| KR | 10-2019-0006342 | A | | 1/2019 | |
| KR | 10-2022666 | B1 | | 9/2019 | |
| KR | 10-2021-0009786 | A | | 1/2021 | |
| SE | 518 706 | C2 | | 11/2002 | |

OTHER PUBLICATIONS

European Search Report dated May 21, 2024, issued in European Application No. 22788474.9.

* cited by examiner

ELECTRONIC DEVICE INCLUDING AN ANTENNA

CROSS-REFERENCE TO RELATED APPLICATION(S)

This application is a continuation application, claiming priority under § 365(c), of an International application No. PCT/KR2022/005421, filed on Apr. 14, 2022, which is based on and claims the benefit of a Korean patent application number 10-2021-0048817, filed on Apr. 14, 2021, in the Korean Intellectual Property Office, and of a Korean patent application number 10-2021-0122728, filed on Sep. 14, 2021, in the Korean Intellectual Property Office, the disclosure of each of which is incorporated by reference herein in its entirety.

TECHNICAL FIELD

The disclosure relates to an electronic device including an antenna.

BACKGROUND ART

With the development of information technology (IT), various types of electronic devices such as a smartphone and a tablet personal computer (PC) are popularized. An electronic device is capable of wirelessly communicating with another electronic device by using an antenna module. Recently, the 5' generation (5G) mobile communication technology has been developed due to a rapid increase in network traffic caused by electronic devices. For the 5G mobile communication, the number of antennas disposed in the electronic device may be increased. As a frequency band (e.g., about 6 GHz or higher) for the 5G mobile communication network is used, the wavelength of signals can be shortened to the unit of millimeters and the bandwidth can be used more widely, allowing more amounts of information to be transmitted or received.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

As communication methods are developed, electronic devices come to use 5G communication method. As various communication schemes including the 5G communication method are applied to the electronic device, the number of antennas to be mounted may increase, and the radiation performance may decrease due to restrictions on a mounting space. In order to overcome such restrictions on the mounting space inside the electronic device, a technology for adding another frequency band to a legacy antenna or adding an antenna to an external case of the electronic device has been developed. Despite such technological development, it may be difficult to arrange antennas for communication of various bands in the limited internal space of the electronic device. That is, despite efforts to ensure the radiation performance by adding a new band to the legacy antenna in the electronic device or by adding a new radiator to the external case of the electronic device, it is still difficult to dispose an antenna of a new band in the limited internal mounting space of the electronic device.

Aspects of the disclosure are to address at least the above-mentioned problems and/or disadvantages and to provide at least the advantages described below. Accordingly, an aspect of the disclosure is to provide an electronic device capable of ensuring the radiation performance by arranging an antenna in an area surrounded by a loop antenna in case that the loop antenna is applied to the electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a housing having a front surface and a rear surface, a first antenna, a second antenna, a printed circuit board, and an electromagnetic interference (EMI) shielding sheet. The first antenna may be disposed inside the housing. The second antenna may be disposed in an area surrounded by a radiator of the first antenna when viewed from above the rear surface. The printed circuit board may include a wireless communication module for operating the first antenna and the second antenna, and may be electrically connected to the first antenna and the second antenna. The first antenna may be positioned between the rear surface and the EMI shielding sheet.

Advantageous Effects of Invention

According to various embodiments of the disclosure, by disposing the second antenna (e.g., a patch antenna) in a space inside the first antenna (e.g., an NFC antenna), the electronic device can realize an efficient arrangement of antennas and improve the antenna performance.

In addition, various effects explicitly or implicitly appreciated through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
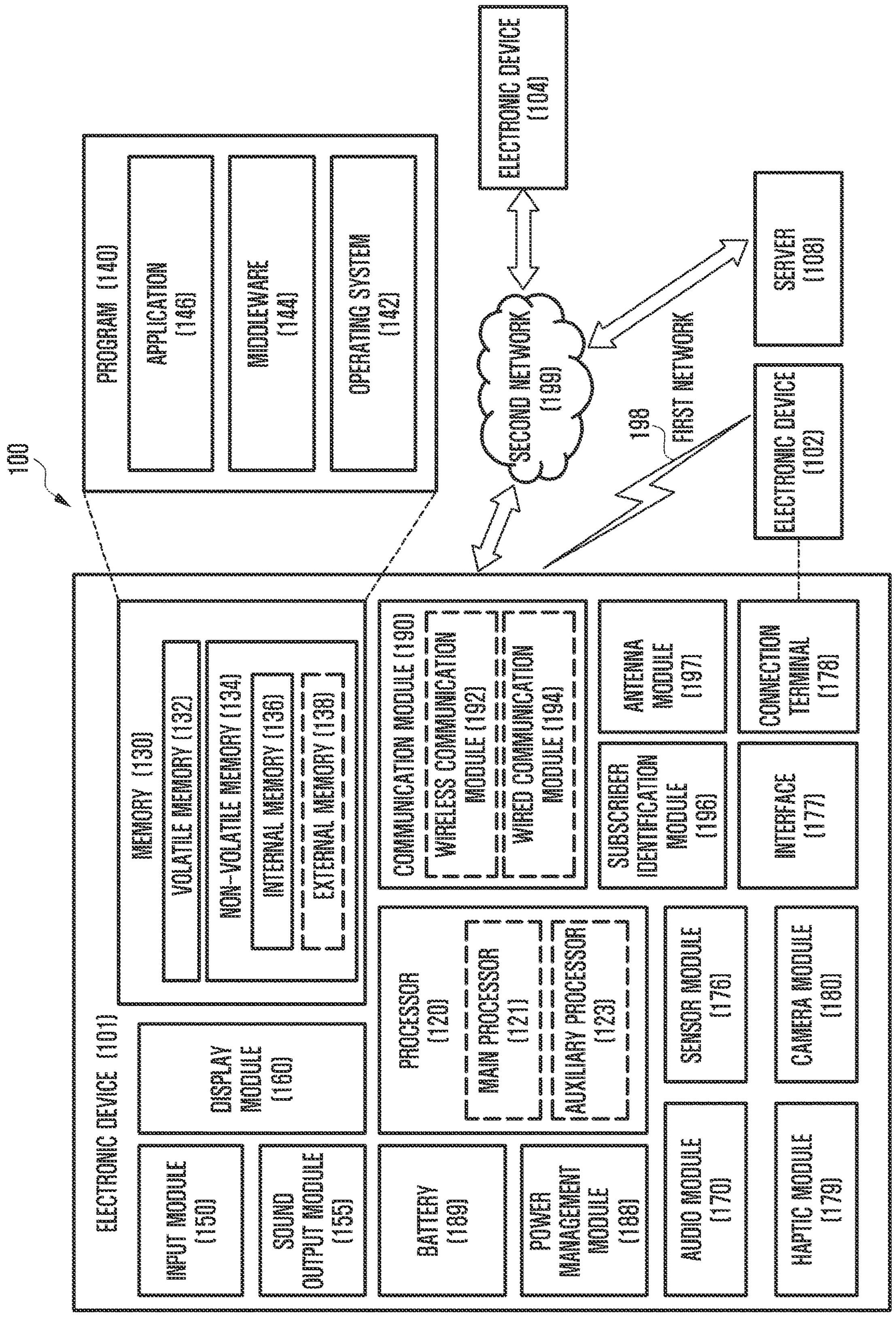
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the display module 160 shown in FIG. 1 may include a flexible display configured to allow a screen (e.g., a display screen) to be folded or unfolded.

According to an embodiment, the display module 160 shown in FIG. 1 may include a flexible display disposed slidably to provide a screen (e.g., a display screen).

According to an embodiment, although the display module 160 shown in FIG. 1 is described as including a foldable display or a flexible display, this is not construed as a limitation. The display module 160 may also include a bar type display or a plate type display.

Figure 2A:
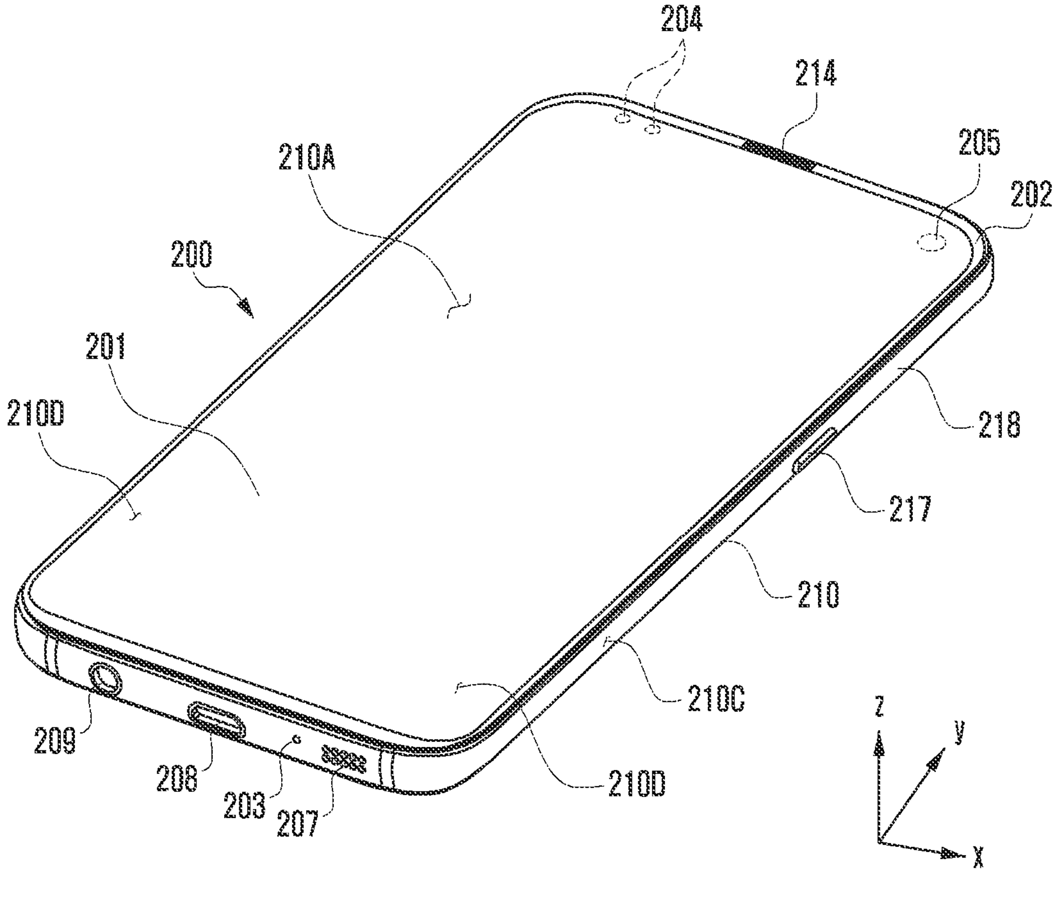
FIG. 2A is a perspective view illustrating a front surface of an electronic device according to an embodiment of the disclosure.
Figure 2B:
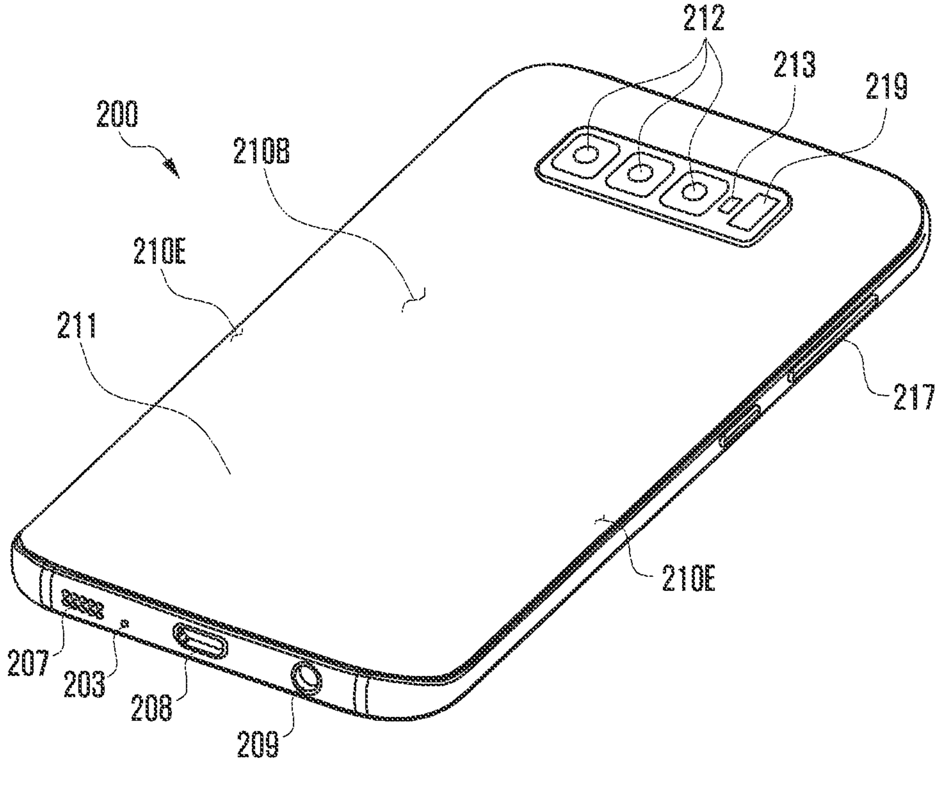
FIG. 2B is a perspective view illustrating a rear surface of an electronic device according to an embodiment of the disclosure.

FIG. 2A is a perspective view illustrating a front surface of an electronic device according to an embodiment of the disclosure. FIG. 2B is a perspective view illustrating a rear surface of an electronic device according to an embodiment of the disclosure.

Referring to FIGS. 2A and 2B, an electronic device 200 (e.g., the electronic device 101 in FIG. 1) according to various embodiments of the disclosure may include a first surface (or front surface) 210A, a second surface (or rear surface) 210B, and a housing 210. A display 201 (e.g., the display module 160 in FIG. 1) may be disposed in a space formed by the housing 210. The housing 210 may have a side surface 210C surrounding a space between the first surface 210A and the second surface 210B. In another embodiment, the housing 210 may refer to a structure forming a portion of the first surface 210A, the second surface 210B, and the side surface 210C.

According to an embodiment, the first surface 210A may be formed by a front plate 202 (e.g., a glass plate including various coating layers, or a polymer plate) that is substantially transparent at least in part.

According to an embodiment, the second surface 210B may be formed by a rear plate 211 that is substantially opaque. The rear plate 211 may be formed by, for example, coated or colored glass, ceramic, polymer, metal (e.g., aluminum, stainless steel (STS), or magnesium), or a combination of at least two of the above materials. This is, however, not a limitation, and the rear plate 211 may also be formed of transparent glass.

According to an embodiment, the side surface 210C may be formed by a side bezel structure 218 (or "lateral member") combined with the front plate 202 and the rear plate 211 and having a metal and/or a polymer. In a certain embodiment, the rear plate 211 and the side bezel structure 218 may be integrally formed and include the same material (e.g., a metal material such as aluminum).

In an embodiment, the front plate 202 may have two first regions 210D that bend and extend seamlessly from the first surface 210A toward the rear plate 211. The two first regions 210D may be disposed at both long edges of the front plate 202.

In an embodiment, the rear plate 211 may have two second regions 210E that extend seamlessly from the second surface 210B toward the front plate 202.

In a certain embodiment, the front plate 202 (or the rear plate 211) may have only one of the first regions 210D (or the second regions 210E). In a certain embodiment, some of the first regions 210D or the second regions 210E may not be included. In embodiments, when viewed from the side surface of the electronic device 200, the side bezel structure 218 may have a first thickness (or width) at a side surface in which the first region 210D or the second region 210E is not included and have a second thickness smaller than the first thickness at a side surface including the first region 210D or the second region 210E.

In an embodiment, the electronic device 200 may include at least one of a display 201 (e.g., the display module 160 in FIG. 1), a sound input device 203 (e.g., the input module 150 in FIG. 1), sound output devices 207 and 214 (e.g., the sound output module 155 in FIG. 1), sensor modules 204 and 219 (e.g., the sensor module 176 in FIG. 1), camera modules 205 and 212 (e.g., the camera module 180 in FIG. 1), a flash 213, a key input device 217, an indicator (not shown), and connectors 208 and 209. In a certain embodiment, at least one of the components of the electronic device 200 (e.g., the key input device 217) may be omitted, or any other component may be further included.

According to an embodiment, the display 201 (e.g., the display module 160 in FIG. 1) may be visually seen through an upper portion of the front plate 202. In a certain embodiment, at least a portion of the display 201 may be visible through the front plate 202 that forms the first surface 210A and the first region 210D of the side surface 210C. The display 201 may be disposed to be combined with or adjacent to a touch sensing circuit, a pressure sensor capable of measuring the intensity (pressure) of a touch, and/or a digitizer capable of detecting a stylus pen of magnetic field type. In a certain embodiment, at least a portion of the sensor modules 204 and 219 and/or at least a portion of the key input device 217 may be disposed in the first region 210D and/or the second region 210E.

In a certain embodiment, on a rear surface of a screen display area of the display 201, at least one of the sensor module 204, the first camera module 205 (e.g., an image sensor), the audio module 214, and a fingerprint sensor may be included.

According to a certain embodiment, the display 201 may be disposed to be combined with or adjacent to a touch sensing circuit, a pressure sensor capable of measuring the intensity (pressure) of a touch, and/or a digitizer capable of detecting a stylus pen of magnetic field type.

According to a certain embodiment, at least a portion of the sensor modules 204 and 219 and/or at least a portion of the key input device 217 may be disposed in the first regions 210D and/or the second regions 210E.

According to an embodiment, the sound input device 203 may include a microphone. In a certain embodiment, the sound input device 203 may include a plurality of microphones arranged to detect the direction of sound. The sound output devices 207 and 214 may include an external speaker 207 and a call receiver (e.g., an audio module 214). In a certain embodiment, the sound input device 203 (e.g., a microphone), the sound output devices 207 and 214, and the connectors 208 and 209 may be disposed in the internal space of the electronic device 200 and exposed to the external environment through at least one hole formed in the housing 210. In a certain embodiment, the hole formed in the housing 210 may be commonly used for the sound input device 203 (e.g., a microphone) and the sound output devices 207 and 214. In a certain embodiment, the sound output devices 207 and 214 may include a speaker (e.g., a piezo speaker) operated without any hole formed in the housing 210.

According to an embodiment, the sensor modules 204 and 219 (e.g., the sensor module 176 in FIG. 1) may generate signals or data values corresponding to an internal operating state or an external environmental state of the electronic device 200. The sensor modules 204 and 219 may include, for example, a first sensor module 204 (e.g., a proximity sensor) disposed on the first surface 210A of the housing 210 and/or a second sensor module 219 (e.g., a heart rate monitor (HRM) sensor) and/or third sensor module (not shown) (e.g., a fingerprint sensor) disposed on the second surface 210B of the housing 210. For example, the fingerprint sensor may also be disposed on the first surface 210A (e.g., the display 201) and/or second surface 210B of the housing 210. Although not shown, the electronic device 200 may further include, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the camera modules 205 and 212 may include a first camera module 205 disposed on the first surface 210A of the electronic device 200, and a second camera module 212 disposed on the second surface 210B of the electronic device 200. The flash 213 may be disposed near the camera modules 205 and 212. The camera modules 205 and 212 may include one or more lenses, an image sensor, and/or an image signal processor. The flash 213 may include, for example, a light emitting diode or a xenon lamp.

In an embodiment, the first camera module 205 may be disposed under the display panel of the display 201 in an under display camera (UDC) style. In a certain embodiment, two or more lenses (wide-angle and telephoto lenses) and image sensors may be disposed on one surface of the electronic device 200. In a certain embodiment, a plurality of first camera modules 205 may be disposed on a first surface (e.g., a surface on which the screen is displayed) of the electronic device 200 in the UDC style.

In an embodiment, the key input devices 217 may be disposed on the side surface 210C of the housing 210. In another embodiment, the electronic device 200 may not include some or all of the key input devices 217 and the non-included key input devices 217 may be implemented in other form such as soft keys on the display 201. In a certain embodiment, the key input device 217 may be implemented using a pressure sensor included in the display 201.

In an embodiment, the connectors 208 and 209 may include a first connector hole 208 capable of accommodating a connector (e.g., a USB connector) for transmitting and receiving power and/or data to and from an external electronic device, and/or a second connector hole 209 (or earphone jack) capable of accommodating a connector for transmitting and receiving audio signals to and from an external electronic device. The first connector hole 208 may include a universal serial bus (USB) type-A port or a USB type-C port. When the first connector hole 208 supports the USB type-C, the electronic device 200 (e.g., the electronic device 101 in FIG. 1) may support USB power delivery (PD) charging.

In an embodiment, the first camera module 205 among the camera modules 205 and 212 and/or the sensor module 204 among the sensor modules 204 and 219 may be disposed to be visually seen through the display 201. In another example, when the first camera module 205 is disposed in the Under Display Camera (UDC) style, the first camera module 205 may not be visually seen to the outside.

In an embodiment, the first camera module 205 may be disposed to overlap with the display area, and the screen may also be displayed in the display area corresponding to the first camera module 205. The sensor module 204 may be disposed to perform its function without being visually exposed through the front plate 202 in the internal space of the electronic device.

Figure 3A:
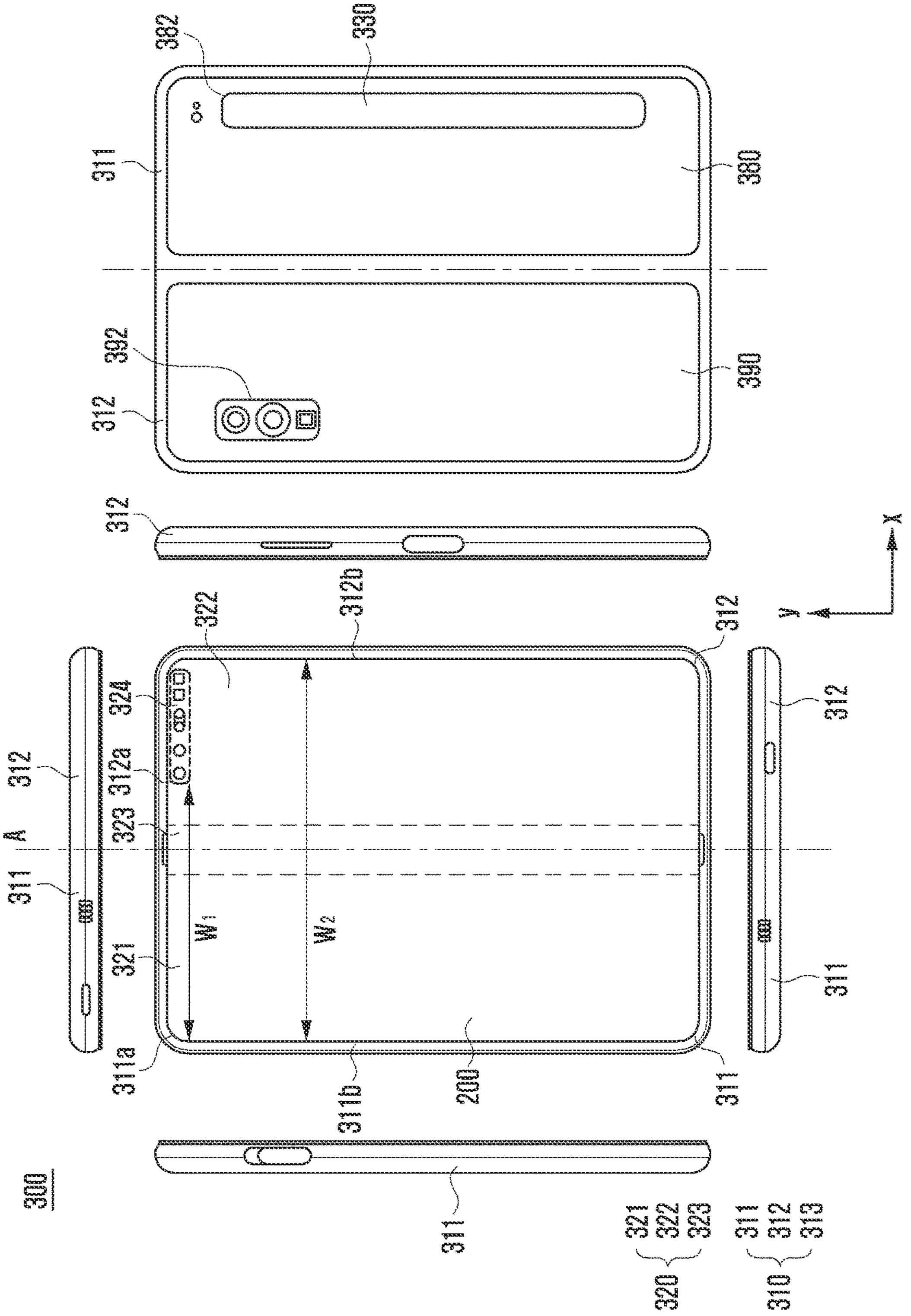
FIG. 3A is a diagram illustrating an unfolded (e.g., opened) state of an electronic device according to an embodiment of the disclosure.
Figure 3B:
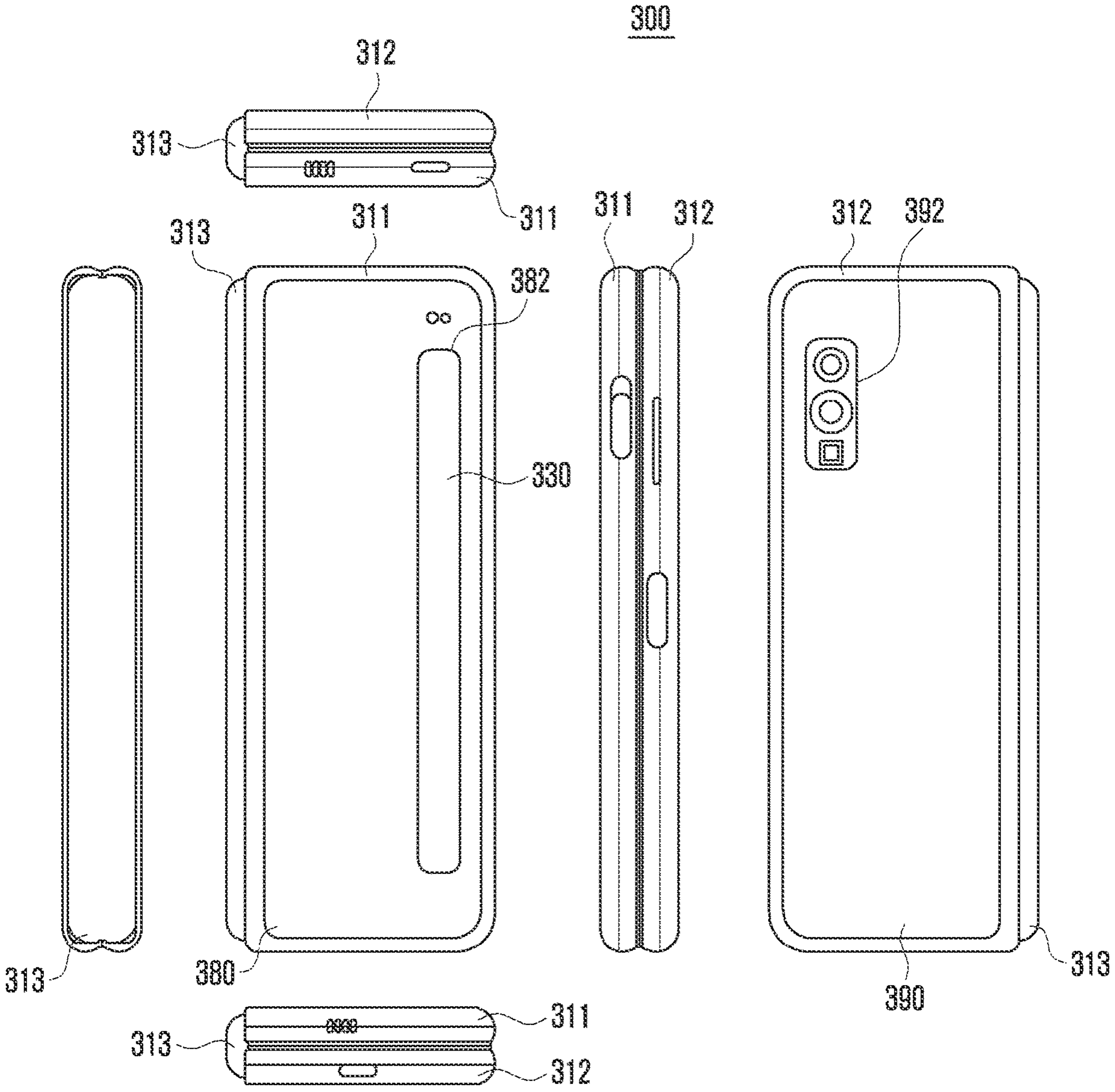
FIG. 3B is a diagram illustrating a folded (e.g., closed) state of an electronic device according to an embodiment of the disclosure.

FIG. 3A is a diagram illustrating an unfolded (e.g., opened) state of an electronic device according to an embodiment of the disclosure. FIG. 3B is a diagram illustrating a folded (e.g., closed) state of an electronic device according to an embodiment of the disclosure.

Referring to FIGS. 3A and 3B, an electronic device 300 (e.g., the electronic device 101 in FIG. 1) may include a housing 310 and a display 320 disposed in a space formed by the housing 310. In an embodiment, the display 320 may include a flexible display or a foldable display.

According to an embodiment, the surface on which the display 320 is disposed may be defined as a first surface or a front surface of the electronic device 300 (e.g., a surface on which a screen is displayed when unfolded). In addition, the opposite surface of the front surface may be defined as a second surface or a rear surface of the electronic device 300. Also, the surface surrounding a space between the front and rear surfaces may be defined as a third surface or a side surface of the electronic device 300. For example, the electronic device 300 may be folded or unfolded in a folding region 323 in a first direction (e.g., the x-axis direction) based on a folding axis (e.g., the A-axis).

In an embodiment, the housing 310 may include a first housing structure 311, a second housing structure 312 having a sensor region 324, a first rear cover 380, and/or a second rear cover 390. The housing 310 of the electronic device 300 is not limited to the shape and combination shown in FIGS. 3A and 3B, and may be implemented in other shape and/or combination of components. For example, in another embodiment, the first housing structure 311 and the first rear cover 380 may be integrally formed, and the second housing structure 312 and the second rear cover 390 may be integrally formed.

In an embodiment, the first housing structure 311 and the second housing structure 312 may be disposed on both sides about the folding axis A and have an overall symmetrical shape with respect to the folding axis A. An angle between the first housing structure 311 and the second housing structure 312 may be varied depending on whether the state of the electronic device 300 is an unfolded state (e.g., a first state), a folded state (e.g., a second state), or an intermediate state (e.g., a third state).

In an embodiment, the second housing structure 312, unlike the first housing structure 311, has the sensor region 324 in which various sensors (e.g., an illuminance sensor, an iris sensor, and/or an image sensor) are disposed. Except for the sensor region 324, the first and second housing structures may have a symmetrical shape. In another example, the sensor region 324 may be disposed in the first housing structure 311 or may be omitted.

In an embodiment, at least one sensor (e.g., a camera module, an illuminance sensor, an iris sensor, and/or an image sensor) may be disposed under the display and/or in a bezel area as well as in the sensor region 324.

In an embodiment, the first housing structure 311 and the second housing structure 312 may form a recess for accommodating the display 320. In the illustrated embodiment, because of the sensor region 324, the recess may have two or more different widths in a direction (e.g., the x-axis direction) perpendicular to the folding axis A.

For example, the recess may have a first width W1 between a first portion 311*a* of the first housing structure 311 and a first portion 312*a* of the second housing structure 312 that is provided at an edge of the sensor area 324 of the second housing structure 312. The recess may have a second width W2 formed by a second portion 311*b* of the first housing structure 311 that is parallel to the folding axis A in the first housing structure 311 and a second portion 312*b* of the second housing structure 312 that does not correspond to the sensor area 324 in the second housing structure 312 and is parallel to the folding axis A. In this case, the second width W2 may be greater than the first width W1. In other words, the first portion 311*a* of the first housing structure 311 and the first portion 312*a* of the second housing structure 312, which have mutually asymmetric shapes, may form the first width W1 of the recess. The second portion 311*b* of the first housing structure 311 and the second portion 312*b* of the second housing structure 312, which have mutually symmetrical shapes, may form the second width W2 of the recess.

In an embodiment, a first portion 312*a* and a second portion 312*b* of the second housing structure 312 may have different distances from the folding axis A. The width of the recess is not limited to the illustrated example. In various embodiments, the recess may have a plurality of widths depending on the shape of the sensor region 324 or a portion having an asymmetric shape between the first and second housing structures 311 and 312.

In an embodiment, at least a portion of the first and second housing structures 311 and 312 may be formed of a metallic or non-metallic material having a selected rigidity to support the display 320.

In an embodiment, the sensor region 324 may be formed to have a certain area adjacent to one corner of the second housing structure 312. However, the arrangement, shape, and size of the sensor region 324 are not limited to the illustrated example. For example, in another embodiment, the sensor region 324 may be provided at another corner of the second housing structure 312 or any position between upper and lower corners.

In an embodiment, components for performing various functions of the electronic device 300 may be exposed to the front surface of the electronic device 300 through the sensor region 324 or through one or more openings provided in the sensor region 324. In various embodiments, such components may include various types of sensors. Such sensors may include, for example, at least one of an illuminance sensor, a front camera (e.g., a camera module), a receiver, or a proximity sensor.

In an embodiment, the first rear cover 380 is disposed on one side of the folding axis A on the rear surface of the electronic device 300, and may have, for example, a substantially rectangular periphery, which may be surrounded by the first housing structure 311. In addition, the second rear cover 390 is disposed on the other side of the folding axis A on the rear surface of the electronic device, and may have a periphery surrounded by the second housing structure 312.

In an embodiment, the first rear cover 380 and the second rear cover 390 may have a substantially symmetrical shape with respect to the folding axis A. However, the first and second rear covers 380 and 390 do not necessarily have a symmetrical shape, and in another embodiment, the electronic device 300 may include the first and second rear covers 380 and 390 having various shapes. In still another embodiment, the first rear cover 380 may be integrally formed with the first housing structure 311, and the second rear cover 390 may be integrally formed with the second housing structure 312.

In an embodiment, the first rear cover 380, the second rear cover 390, the first housing structure 311, and the second housing structure 312 may form a space in which various components (e.g., a printed circuit board or a battery) of the electronic device 300 can be disposed. In an embodiment, one or more components may be disposed on or visually exposed to the rear surface of the electronic device 300. For example, at least a portion of a sub-display 330 may be visually exposed through a first rear region 382 of the first rear cover 380. In another embodiment, one or more components or sensors may be visually exposed through a second rear region 392 of the second rear cover 390. In various embodiments, such sensors may include an illuminance sensor, a proximity sensor, and/or a rear camera.

In an embodiment, a hinge cover 313 may be configured to be disposed between the first housing structure 311 and the second housing structure 312 to obscure an internal component (e.g., a hinge structure). The hinge cover 313 may cover a portion where the first and second housing structures 311 and 312 are in contact with each other when the electronic device 300 is unfolded or folded.

In an embodiment, depending on the state (the unfolded (or flat) state or the folded state) of the electronic device 300, the hinge cover 313 may be obscured or exposed to the outside by a portion of the first and second housing structures 311 and 312. In an embodiment, when the electronic device 300 is in the unfolded state, the hinge cover 313 may be obscured and not exposed by the first and second housing structures 311 and 312. In an embodiment, when the electronic device 300 is in the folded state (e.g., a fully folded state), the hinge cover 313 may be exposed to the outside between the first and second housing structures 311 and 312. In an embodiment, in case of an intermediate state in which the first and second housing structures 311 and 312 are folded with a certain angle, the hinge cover 313 may be exposed in part to the outside between the first and second housing structures 311 and 312. However, in this case, the exposed area may be less than that in the fully folded state. In an embodiment, the hinge cover 313 may have a curved surface.

The display 320 may be disposed in a space formed by the housing 310. For example, the display 320 may be placed in a recess formed by the housing 310 and form a great part of the front surface of the electronic device 300.

According to an embodiment, the front surface of the electronic device 300 may be composed of the display 320 and a part of the first and second housing structures 311 and 312 adjacent to the display 320. In addition, the rear surface of the electronic device 300 may be composed of the first rear cover 380, a part of the first housing structure 311 adjacent to the first rear cover 380, the second rear cover 390, and a part of the second housing structure 312 adjacent to the second rear cover 390.

According to an embodiment, the display 320 may refer to a display in which at least a portion can be modified to a flat surface or a curved surface. In an embodiment, the display 320 may have a folding region 323, a first region 321 disposed on one side (e.g., the left side in FIG. 3A) of the folding region 323, and a second region 322 disposed on the other side (e.g., the right side in FIG. 3A) of the folding region 323.

In an embodiment, the display 320 may include an organic light emitting diodes (OLED) display of a top emission or bottom emission type. The OLED display may include a low temperature color filter (LTCF) layer, a window glass (e.g., ultra-thin glass (UTG) or polymer window), and/or an optical compensation film (OCF). The LTCF layer of the OLED display may be replaced with a polarizing film (or polarizing layer).

Dividing the display 320 into regions is exemplary, and the display 320 may be divided into a plurality (e.g., two or more) regions based on a structure or function. Although in one embodiment the display 320 may be divided into regions based on the folding region 323 or the folding axis A extending parallel to the y-axis, in another embodiment the display 320 may also be divided into regions based on another folding region (e.g., a folding region parallel to the x-axis) or another folding axis (e.g., a folding axis parallel to the x-axis).

In an embodiment, the first region 321 and the second region 322 may have an overall symmetrical shape with respect to the folding region 323.

Hereinafter, the respective regions of the display 320 and the operations of the first and second housing structures 311 and 312 according to the states (e.g., the unfolded (or flat) state and the folded state) of the electronic device 300 will be described.

In an embodiment, when the electronic device 300 is in the unfolded or flat state (e.g., FIG. 3A), the first and second housing structures 311 and 312 may be disposed to form an angle of 180 degrees therebetween and face substantially the same direction. The surface of the first region 321 and the surface of the second region 322 of the display 320 may form about 180 degrees with each other and face substantially the same direction (e.g., the front direction of the electronic device). The folding region 323 may be substantially coplanar with the first and second regions 321 and 322.

In an embodiment, when the electronic device 300 is in the folded state (e.g., FIG. 3B), the first and second housing structures 311 and 312 may be disposed to face each other. The surface of the first region 321 and the surface of the second region 322 of the display 320 may face each other while forming a narrow angle therebetween (e.g., between about 0 degrees and about 10 degrees). The folding region 323 may be formed, at least in part, of a curved surface having a certain curvature.

In an embodiment, when the electronic device 300 is in the intermediate state (or a half folded state), the first and second housing structures 311 and 312 may be disposed with a certain angle therebetween. The surface of the first region 321 and the surface of the second region 322 of the display 320 may form an angle greater than that in the folded state and smaller than that in the unfolded state. The folding region 323 may be formed, at least in part, of a curved surface having a certain curvature, and this curvature may be smaller than that in the folded state.

The electronic device according to various embodiments of the disclosure may include electronic devices of various types such as a bar type, a foldable type, a rollable type, a slidable type, a wearable type, a tablet personal computer (PC), and/or a notebook PC. The electronic device 200 according to various embodiments of the disclosure is not limited to the above-described examples and may include various other electronic devices.

Figure 4A:
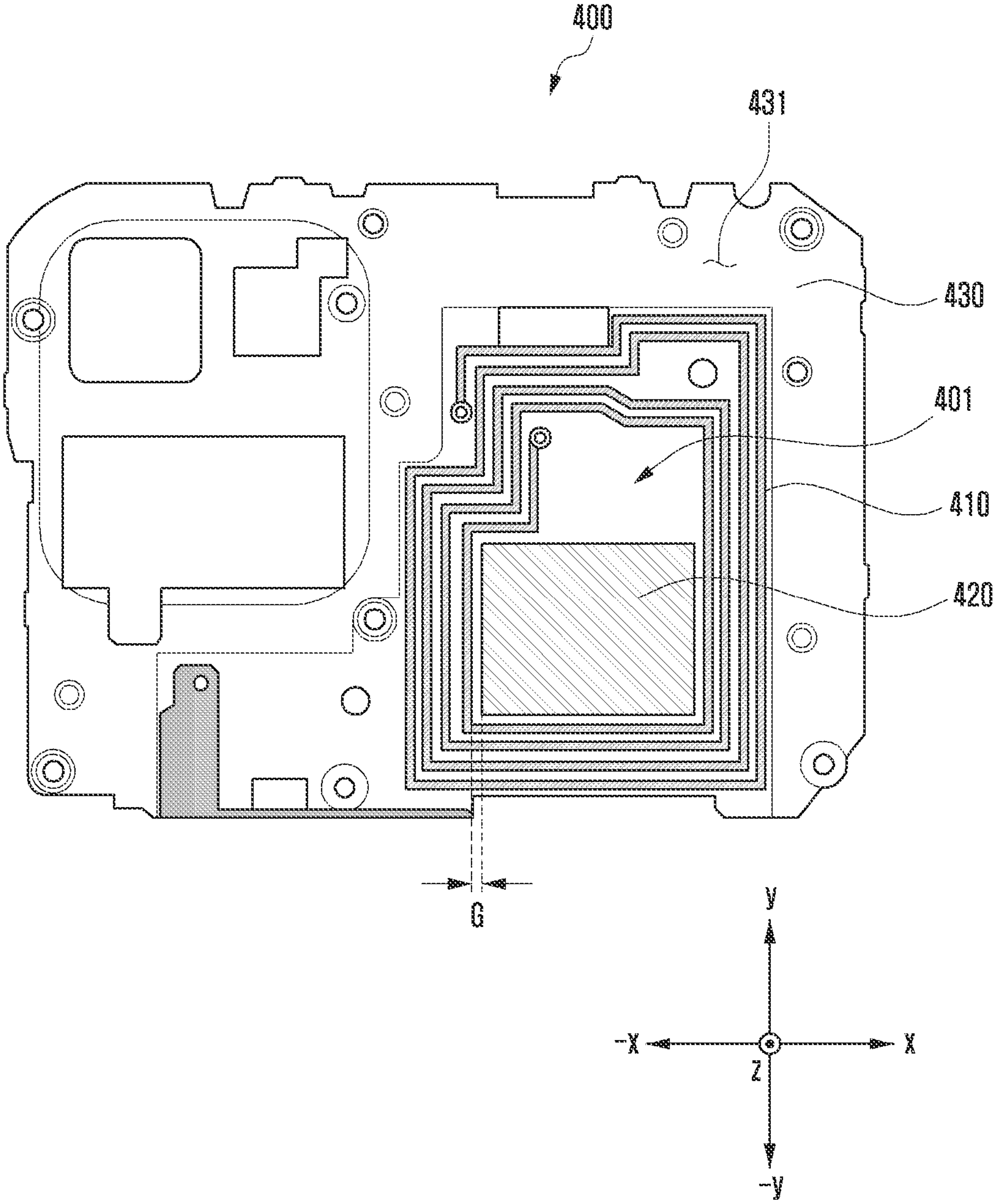
FIG. 4A is a diagram illustrating an antenna structure of an electronic device, when viewed from a first direction (e.g., a front surface), according to an embodiment of the disclosure.
Figure 4B:
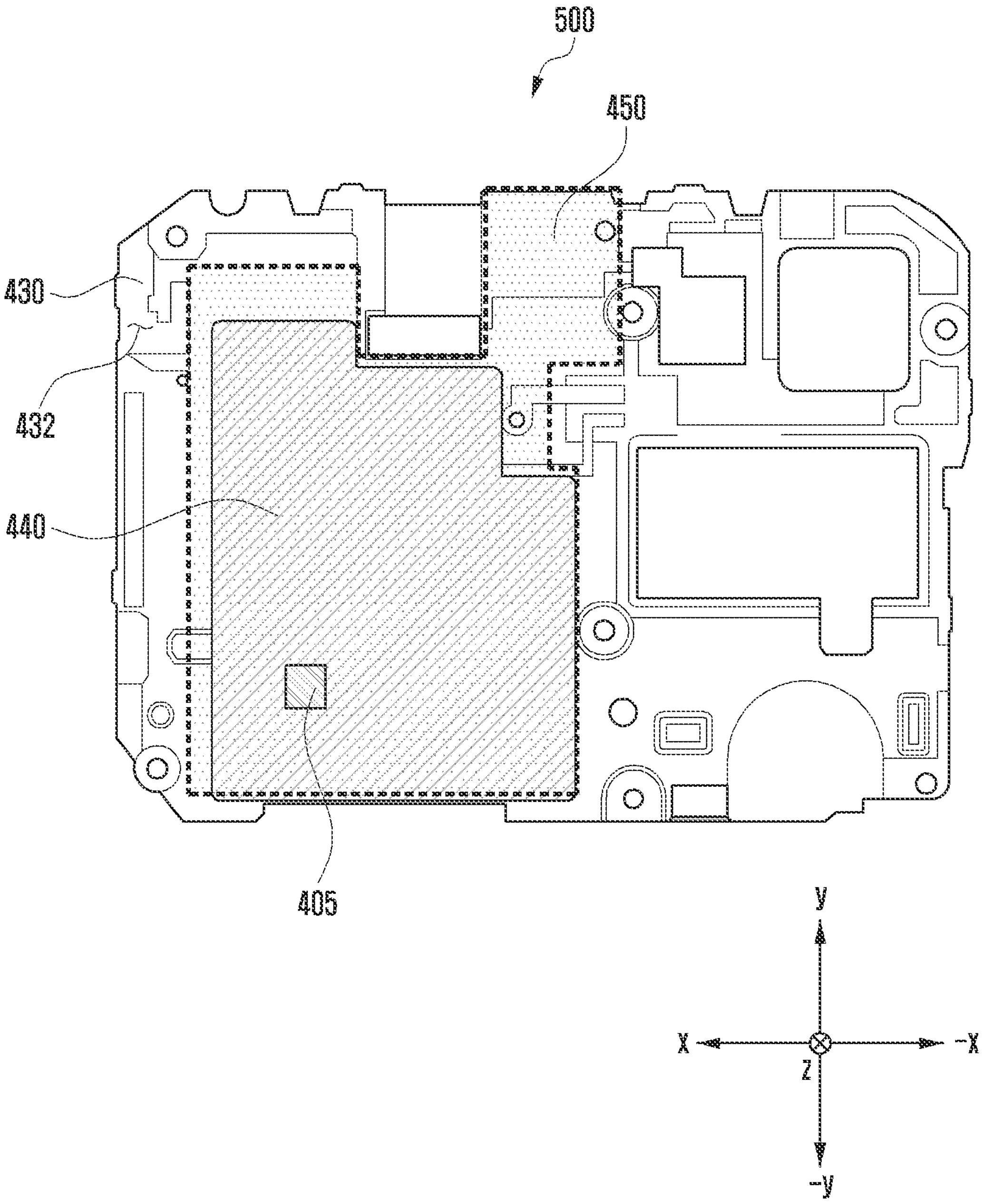
FIG. 4B is a diagram illustrating an antenna structure of an electronic device, viewed from a second direction (e.g., a rear surface), according to an embodiment of the disclosure.
Figure 5A:
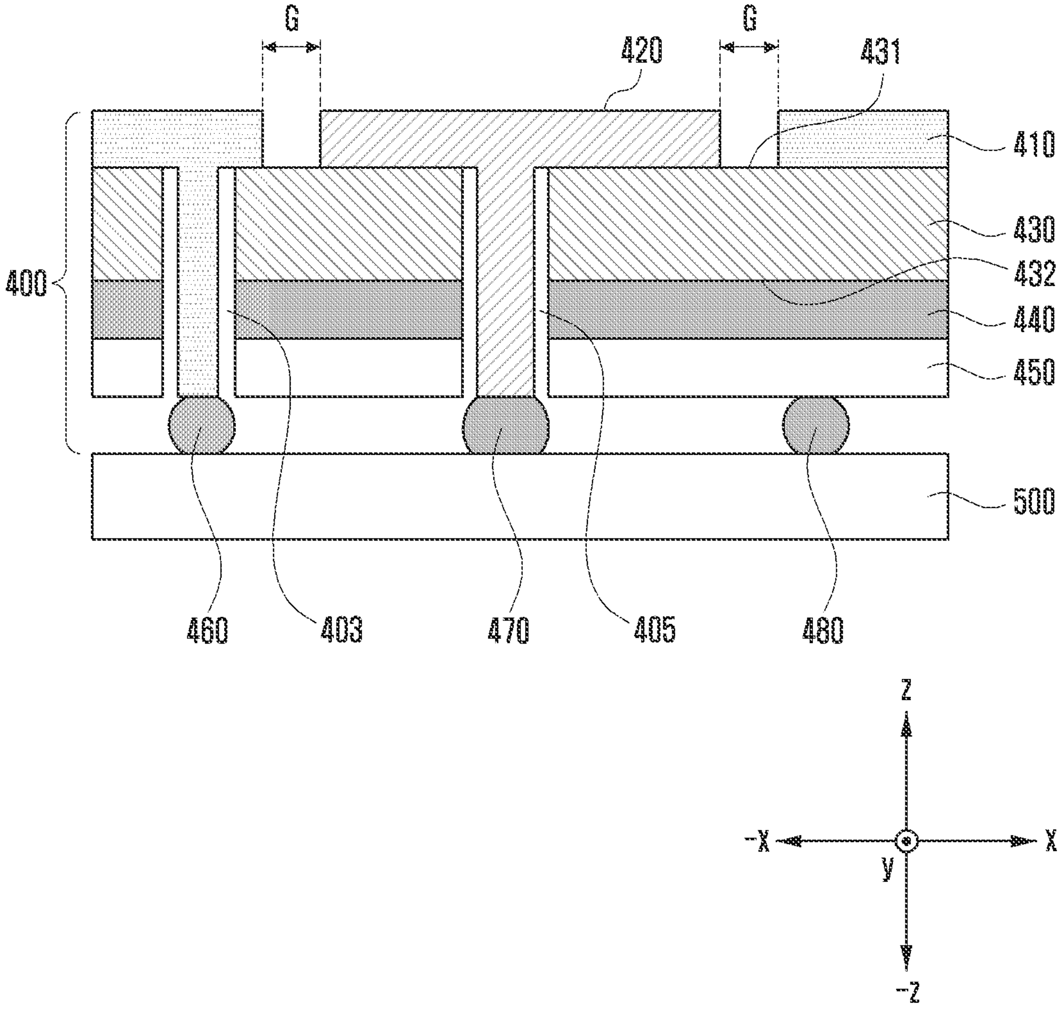
FIG. 5A is a cross-sectional view of the antenna structure shown in FIG. 4A according to an embodiment of the disclosure.

FIG. 4A is a diagram illustrating an antenna structure of an electronic device, when viewed from a first direction (e.g., a front surface), according to an embodiment of the disclosure. FIG. 4B is a diagram illustrating an antenna structure of an electronic device, viewed from a second direction (e.g., a rear surface), according to an embodiment of the disclosure. FIG. 5A is a cross-sectional view of the antenna structure shown in FIG. 4A according to an embodiment of the disclosure.

Referring to FIGS. 4A, 4B, and 5A, an electronic device (e.g., the electronic device 200 in FIG. 2A, the electronic device 300 in FIG. 3A) according to various embodiments of the disclosure may include the antenna structure 400, a support member 430 (e.g., an antenna carrier, a housing), an electromagnetic interference (EMI) shielding sheet 440 (e.g., a ferrite sheet), a heat dissipation sheet 450, and/or a printed circuit board 500.

In an embodiment, the antenna structure 400 may be disposed on the support member 430 of the electronic device (e.g., the electronic device 200 in FIG. 2A, the electronic device 300 in FIG. 3A). The antenna structure 400 may include a first antenna 410 (e.g., a near field communication (NFC) antenna), a second antenna 420 (e.g., a patch antenna), a first antenna contact part 460, a second antenna contact part 470, and/or a ground contact part 480.

According to an embodiment, the first antenna 410 (e.g., the NFC antenna) may be disposed in the form of a closed loop, and a space 401 may be formed inside the first antenna 410 (e.g., the NFC antenna). For example, the space 401 formed inside the loop-formed first antenna 410 (e.g., the NFC antenna) may be an area surrounded by a radiator of the first antenna 410 (e.g., the NFC antenna).

In an embodiment, the second antenna 420 (e.g., the patch antenna) may be disposed in the space 401 surrounded by the radiator of the first antenna 410 (e.g., the NFC antenna). The first antenna 410 (e.g., the NFC antenna) and the second antenna 420 (e.g., the patch antenna) may be disposed with a certain gap (G).

In an embodiment, the first antenna 410 (e.g., the NFC antenna) and the second antenna 420 (e.g., the patch antenna) may be disposed on a first surface 431 of the support member 430. For example, the first antenna 410 (e.g., the NFC antenna) and the second antenna 420 (e.g., the patch antenna) may be disposed substantially on the same plane with a certain gap therebetween. For example, the second antenna 420 (e.g., the patch antenna) may include an antenna for another frequency band (e.g., a new radio (NR) band antenna for 5G communication or an ultra-wideband (UWB) antenna).

In an embodiment, the EMI shielding sheet 440 (e.g., the ferrite sheet) may be disposed on a second surface 432 of the support member 430. In an embodiment, the EMI shielding sheet 440 (e.g., the ferrite sheet) may be disposed to overlap with the first antenna 410 (e.g., the NFC antenna) and the second antenna 420 (e.g., the patch antenna) in a vertical direction (e.g., the z-axis direction).

In an embodiment, the heat dissipation sheet 450 may be disposed under (e.g., in the negative z-axis direction) the EMI shielding sheet 440 (e.g., the ferrite sheet). For example, the heat dissipation sheet 450 may have a first area, and the EMI shielding sheet 440 (e.g., the ferrite sheet) may have a second area smaller than the first area. For example, the heat dissipation sheet 450 may be electrically connected to a ground terminal of the printed circuit board 500 through the ground contact part 480. The heat dissipation sheet 450 may be used as a ground (GND) of the second antenna 420 (e.g., the patch antenna). In another embodiment, the heat dissipation sheet 450 may be excluded from the electronic device. In this case, the EMI shielding sheet 440 (e.g., the ferrite sheet) may be used as the ground (GND) of the second antenna 420 (e.g., the patch antenna).

In an embodiment, the printed circuit board 500 may be disposed under (e.g., in the negative z-axis direction) the heat dissipation sheet 450. For example, the heat dissipation sheet 450 may be positioned between the EMI shielding sheet 440 and the printed circuit board 500. In an embodiment, the printed circuit board 500 may include a wireless communication module (e.g., the wireless communication module in FIG. 1) for operating the first antenna 410 (e.g., the NFC antenna) and the second antenna 420 (e.g., the patch antenna).

In an embodiment, a first through-hole 403 and/or a second through-hole 405 may be formed to penetrate the support member 430, the EMI shielding sheet 440 (e.g., the ferrite sheet), and the heat dissipation sheet 450 in the vertical direction (e.g., the z-axis direction). For example, the first antenna 410 may be electrically connected to the printed circuit board 500 via the first through-hole 403 and through the first antenna contact part 460. In addition, the second antenna 420 (e.g., the patch antenna) may be electrically connected to the printed circuit board 500 via the second through-hole 405 and through the second antenna contact part 470.

In case of an electronic device that supports various communication schemes including 5G communication, it may be difficult to arrange an antenna due to a narrow internal space. The electronic device (e.g., the electronic device 200 in FIG. 2A, the electronic device 300 in FIG. 3A) according to various embodiments of the disclosure allows the second antenna 420 (e.g., the patch antenna) for a different frequency band to be disposed in the space 401 inside the first antenna 410 (e.g., the NFC antenna), thus improving space efficiency. For example, the second antenna 420 may include a new radio (NR) band antenna for 5G communication or an ultra-wideband (UWB) antenna.

Figure 5B:
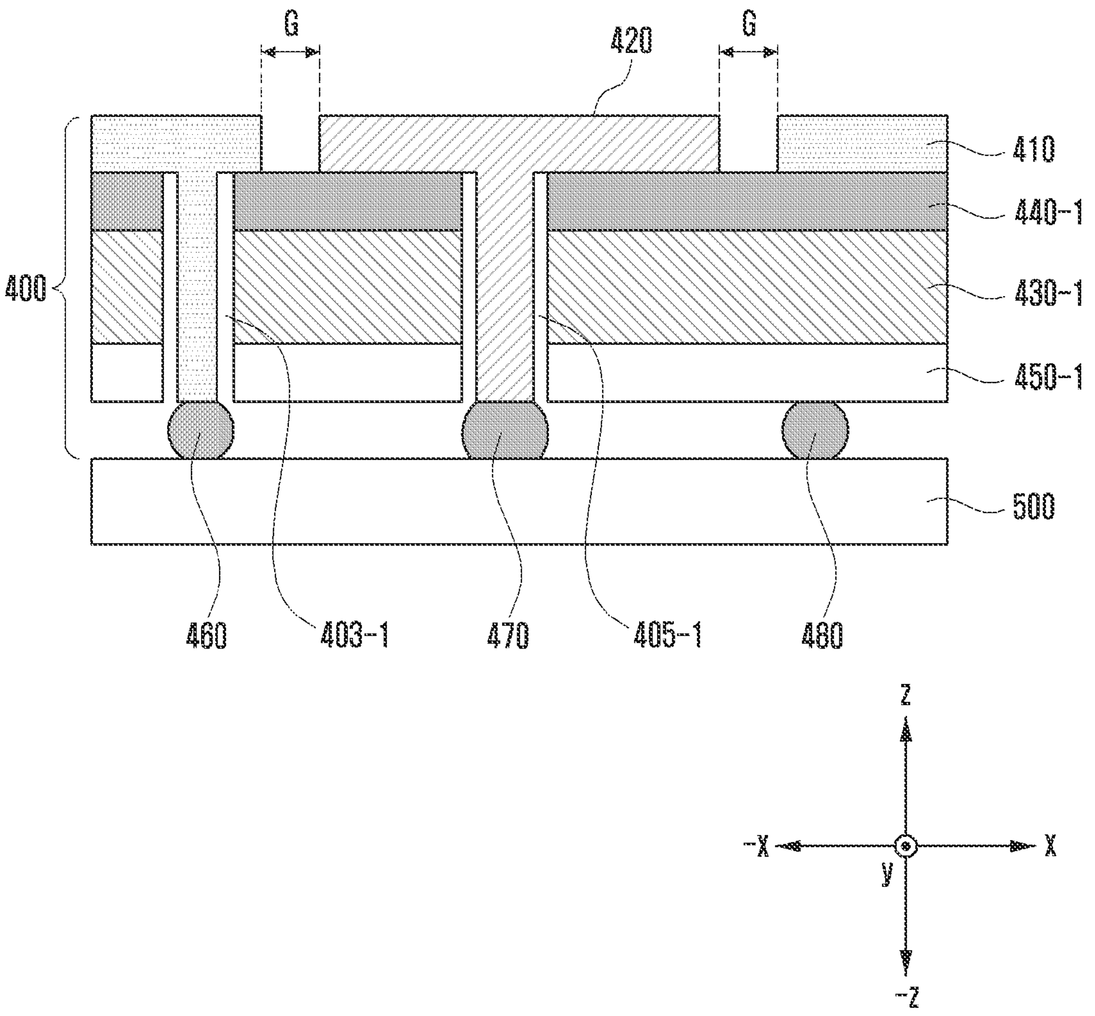
FIG. 5B is a cross-sectional view of the antenna structure shown in FIG. 4A according to an embodiment of the disclosure.

FIG. 5B is a cross-sectional view of an antenna structure according to an embodiment of the disclosure. In describing the electronic device and antenna structure 400 shown in FIG. 5B, a detailed description of the same components as those of the electronic device and antenna structure 400 shown in FIG. 5A may be omitted.

Referring to FIGS. 4A, 4B, and 5B, an electronic device (e.g., the electronic device 200 in FIG. 2A, the electronic device 300 in FIG. 3A) according to various embodiments of the disclosure may include an antenna structure 400, a support member 430-1, an electromagnetic interference (EMI) shielding sheet 440-1 (e.g., a ferrite sheet), a heat dissipation sheet 450-1, and/or the printed circuit board 500.

According to an embodiment, the first antenna 410 (e.g., the NFC antenna) may be disposed in the form of a closed loop, and the space 401 may be formed inside the first antenna 410 (e.g., the NFC antenna). In an embodiment, the second antenna 420 (e.g., the patch antenna) may be disposed in the space 401 inside the first antenna 410 (e.g., the NFC antenna). The first antenna 410 (e.g., the NFC antenna) and the second antenna 420 (e.g., the patch antenna) may be disposed with a certain gap (G).

In an embodiment, the first antenna 410 (e.g., the NFC antenna) and the second antenna 420 (e.g., the patch antenna) may be disposed above (e.g., in the positive z-axis direction) the EMI shielding sheet 440-1 (e.g., the ferrite sheet). The first antenna 410 (e.g., the NFC antenna) and the second antenna 420 (e.g., the patch antenna) may be disposed substantially on the same plane with a certain gap therebetween. For example, the second antenna 420 (e.g., the patch antenna) may include an antenna for another frequency band (e.g., a new radio (NR) band antenna for 5G communication or an ultra-wideband (UWB) antenna). In an embodiment, an insulating material (not shown) may be interposed between the EMI shielding sheet 440-1 and the first antenna 410 (e.g., the NFC antenna) and/or the second antenna 420 (e.g., the patch antenna) so as to insulate the first antenna 410 (e.g., the NFC antenna) and/or the second antenna 420 (e.g., the patch antenna) from the EMI shielding sheet 440-1.

In an embodiment, the EMI shielding sheet 440-1 (e.g., the ferrite sheet) may be disposed to overlap with the first antenna 410 (e.g., the NFC antenna) and the second antenna 420 (e.g., the patch antenna) in a vertical direction (e.g., the z-axis direction).

In an embodiment, the support member 430-1 may be disposed under (e.g., in the negative z-axis direction) the EMI shielding sheet 440-1 (e.g., the ferrite sheet). In an embodiment, the heat dissipation sheet 450-1 may be disposed under (e.g., in the negative z-axis direction) the support member 430-1. For example, the support member 430-1 may be positioned between the EMI shielding sheet 440-1 and the heat dissipation sheet 450-1. In an embodiment, the heat dissipation sheet 450-1 may have a first area, and the EMI shielding sheet 440-1 (e.g., the ferrite sheet) may have a second area smaller than the first area. For example, the heat dissipation sheet 450-1 may be used as a ground (GND) of the second antenna 420 (e.g., the patch antenna).

In an embodiment, a first through-hole 403-1 and/or a second through-hole 405-1 may be formed to penetrate the support member 430-1, the EMI shielding sheet 440-1 (e.g., the ferrite sheet), and the heat dissipation sheet 450-1 in the vertical direction (e.g., the z-axis direction). For example, the first antenna 410 may be electrically connected to the printed circuit board 500 via the first through-hole 403-1 and through the first antenna contact part 460. In addition, the second antenna 420 (e.g., the patch antenna) may be electrically connected to the printed circuit board 500 via the second through-hole 405-1 and through the second antenna contact part 470.

The electronic device (e.g., the electronic device 200 in FIG. 2A, the electronic device 300 in FIG. 3A) according to various embodiments of the disclosure allows the second antenna 420 (e.g., the patch antenna) to be disposed in the space 401 inside the first antenna 410 (e.g., the NFC antenna), thus improving space efficiency. For example, the second antenna 420 may include a new radio (NR) band antenna for 5G communication or an ultra-wideband (UWB) antenna.

Figure 6A:
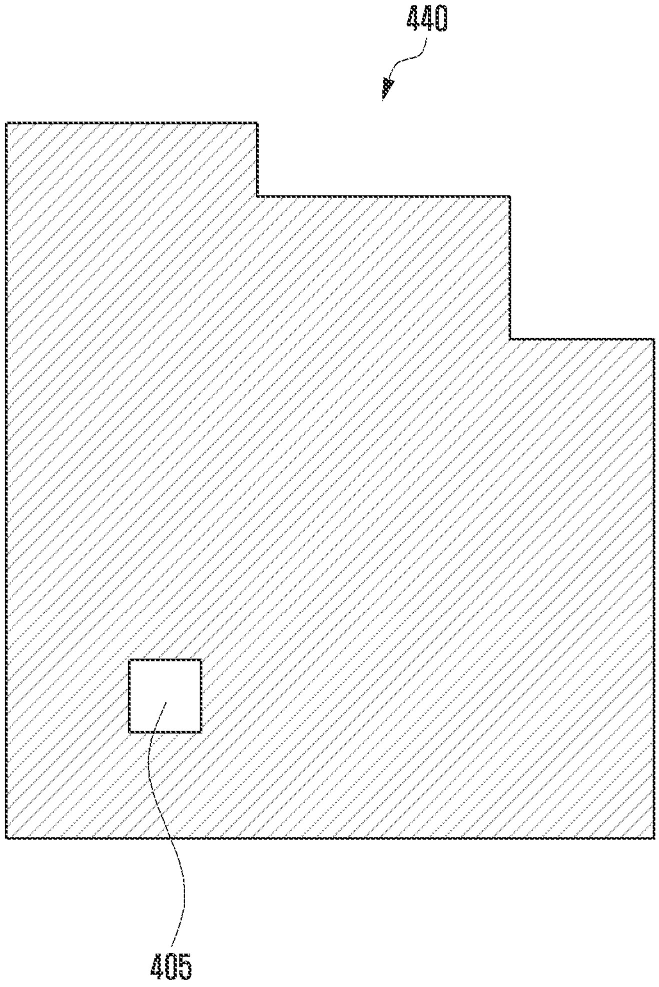
FIG. 6A is a diagram illustrating an electromagnetic interference shielding sheet of an antenna structure according to an embodiment of the disclosure.

FIG. 6A is a diagram illustrating an electromagnetic interference (EMI) shielding sheet of an antenna structure according to an embodiment of the disclosure.

Referring to FIGS. 4A and 6A, an EMI shielding sheet 440 (e.g., the ferrite sheet) is capable of shielding electromagnetic waves generated from the first antenna 410 (e.g., the NFC antenna) and the second antenna 420 (e.g., the patch antenna), thereby preventing eddy currents from flowing.

In an embodiment, the EMI shielding sheet 440 (e.g., the ferrite sheet) may be disposed to overlap with the entire area of the first antenna 410 (e.g., the NFC antenna) and the entire area of the second antenna 420 (e.g., the patch antenna). In the EMI shielding sheet 440 (e.g., the ferrite sheet), at least one through-hole (e.g., the second through-hole 405) may be formed for power feeding to the first antenna 410 (e.g., the NFC antenna) and the second antenna 420 (e.g., the patch antenna).

Figure 6B:
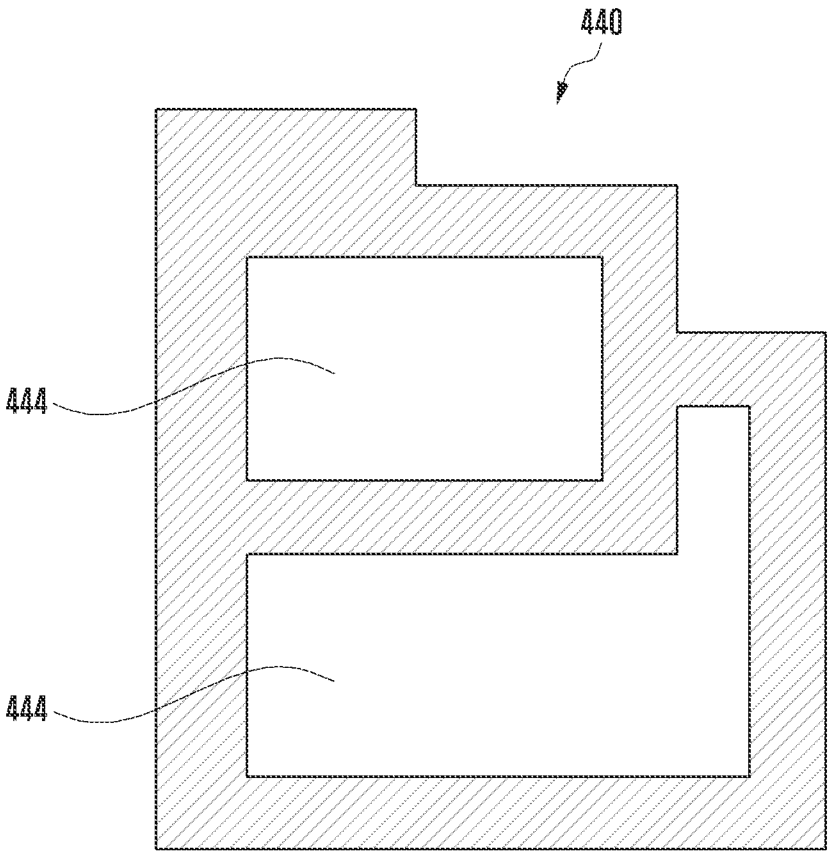
FIG. 6B is a diagram illustrating an electromagnetic interference shielding sheet of an antenna structure according to an embodiment of the disclosure.

FIG. 6B is a diagram illustrating an electromagnetic interference shielding sheet of an antenna structure according to an embodiment of the disclosure.

Referring to FIG. 6B, an EMI shielding sheet 440 (e.g., the ferrite sheet) may be disposed to overlap with the entire area of a first antenna 410 (e.g., the NFC antenna) and a partial area of a second antenna 420 (e.g., the patch antenna). At least partial region 444 of the EMI shielding sheet 440 (e.g., the ferrite sheet) may be removed. Removing the at least partial region 444 of the EMI shielding sheet 440 (e.g., the ferrite sheet) may reduce the weight of the EMI shielding sheet 440 (e.g., the ferrite sheet). Even if the at least partial region 444 is removed, the EMI shielding sheet 440 (e.g., the ferrite sheet) may maintain the performance of shielding electromagnetic waves generated from the first antenna 410 (e.g., the NFC antenna) and the second antenna 420 (e.g., the patch antenna).

Figure 7:
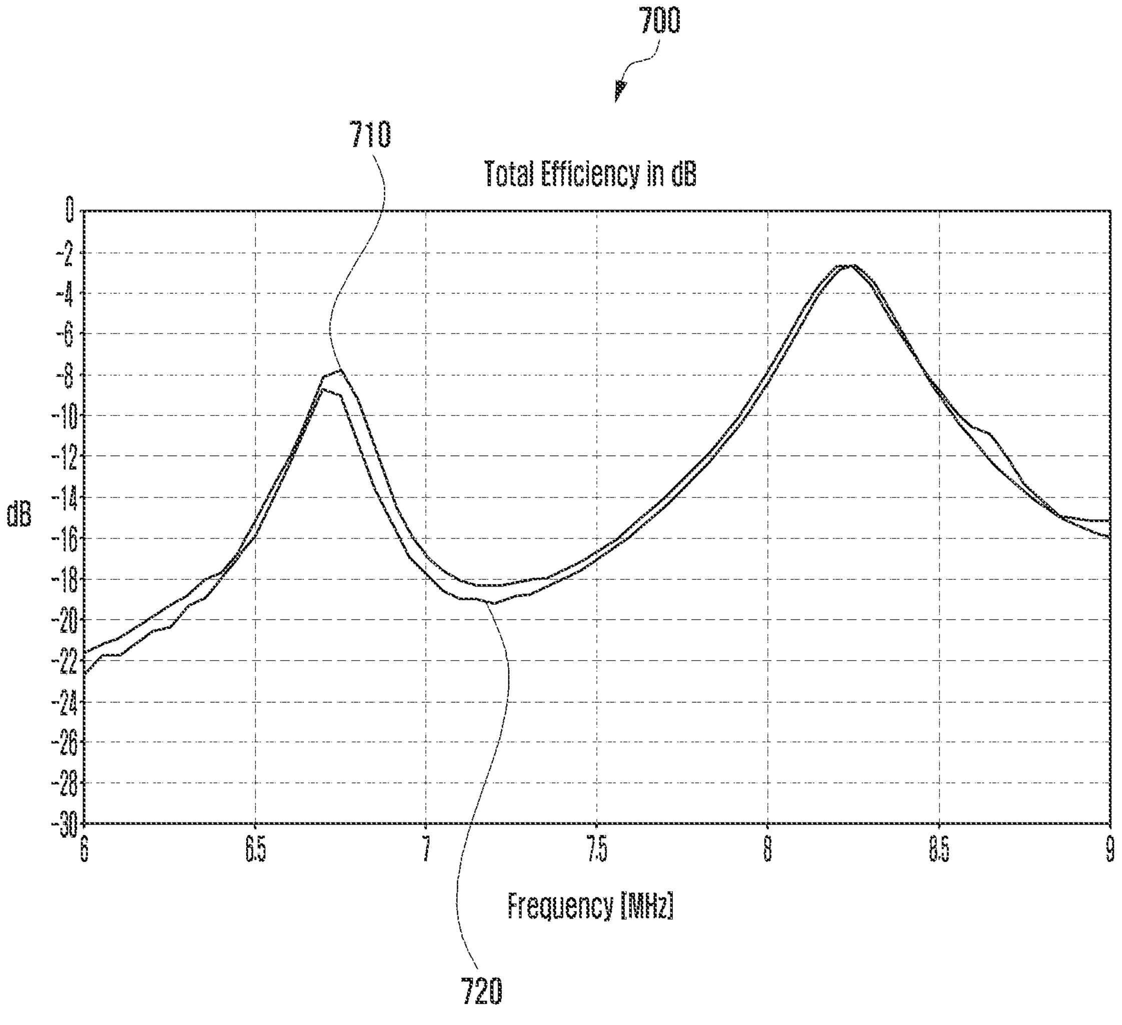
FIG. 7 is a graph showing radio wave radiation performance of an antenna structure according to an embodiment of the disclosure.

FIG. 7 is a graph showing radio wave radiation performance of an antenna structure according to an embodiment of the disclosure.

Referring to FIG. 7 depicting graph 700+, a radio wave radiation performance 710 of an antenna structure in which a second antenna 420 (e.g., the patch antenna) is disposed in a space 401 inside a first antenna 410 (e.g., the NFC antenna) as shown in FIGS. 5A and 5B was compared with the radio wave radiation performance 720 of a new radio (NR) band antenna or ultra-wideband (UWB) antenna separately disposed. It can be seen that there is substantially no difference in radio wave radiation performance from the NR band antenna or UWB antenna separately disposed inside the electronic device.

Figure 8:
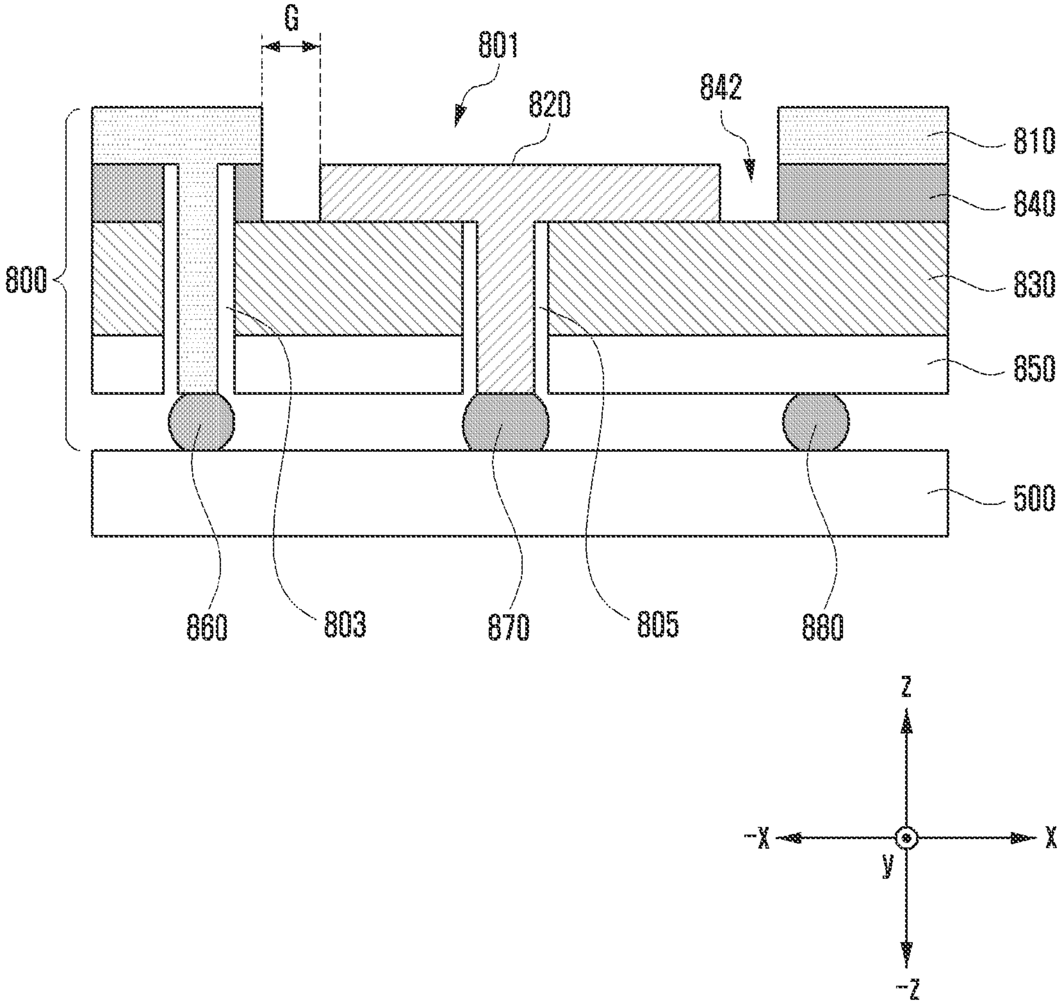
FIG. 8 is a diagram illustrating an antenna structure of an electronic device according to an embodiment of the disclosure.

FIG. 8 is a diagram illustrating an antenna structure of an electronic device according to an embodiment of the disclosure. In describing the electronic device and an antenna structure 800 shown in FIG. 8, a detailed description of the same components as those of the electronic device and the antenna structure 400 shown in FIG. 5B may be omitted.

Referring to FIGS. 4A, 4B, and 8, an electronic device (e.g., the electronic device 200 in FIG. 2A, the electronic device 300 in FIG. 3A) according to various embodiments of the disclosure may include an antenna structure 800, a support member 830, an electromagnetic interference (EMI) shielding sheet 840 (e.g., a ferrite sheet), a heat dissipation sheet 850, and/or the printed circuit board 500.

In an embodiment, the antenna structure 800 may include a first antenna 810 (e.g., an NFC antenna), a second antenna 820 (e.g., a patch antenna), a first antenna contact part 860, a second antenna contact part 870, and/or a ground contact part 880.

According to an embodiment, the first antenna 810 (e.g., the NFC antenna) and the second antenna 820 (e.g., the patch antenna) may be disposed with a certain gap (G). The first antenna 810 may be formed in the form of a flexible printed circuit board (FPCB) together with the EMI shielding sheet 840 (e.g., the ferrite sheet). The second antenna 820 (e.g., the patch antenna) may be formed on the support member 830. In an embodiment, the first antenna 810 and the second antenna 820 may be formed of materials having different manufacturing methods.

According to an embodiment, the first antenna 810 (e.g., the NFC antenna) may be disposed in the form of a closed loop, and a space 801 may be formed inside the first antenna 810 (e.g., the NFC antenna). The second antenna 820 (e.g., the patch antenna) may be disposed in the space 801 inside the first antenna 810 (e.g., the NFC antenna). The first antenna 810 (e.g., the NFC antenna) and the second antenna 820 (e.g., the patch antenna) may be disposed with a certain gap (G).

In an embodiment, the first antenna 810 (e.g., the NFC antenna) may be positioned above (e.g., on one surface facing the positive z-axis direction) the EMI shielding sheet 840 (e.g., the ferrite sheet). For example, the first antenna 810 may be positioned on one surface of the EMI shielding sheet 840, and the first antenna 810 may be positioned in the z-axis direction of the EMI shielding sheet 840. The support member 830 may be positioned under (e.g., on the other surface facing the negative z-axis direction) of the EMI shielding sheet 840 (e.g., the ferrite sheet). For example, the support member 830 may be positioned on the other surface of the EMI shielding sheet 840. In another example, the support member 830 may be positioned in the negative z-axis direction of the EMI shielding sheet 840. For example, the first antenna 810 (e.g., the NFC antenna) may be positioned in the z-axis direction of the EMI shielding sheet 840 (e.g., the ferrite sheet). The support member 830 may be positioned in the negative z-axis direction of the EMI shielding sheet 840 (e.g., the ferrite sheet).

In an embodiment, the second antenna 820 (e.g., the patch antenna) may be disposed above (e.g., in the z-axis direction) the support member 830. In an embodiment, at least partial region of the EMI shielding sheet 840 (e.g., the ferrite sheet) may be removed. The second antenna 820 (e.g., the patch antenna) may be disposed in a portion 842 from which the at least partial region of the EMI shielding sheet 840 (e.g., the ferrite sheet) is removed.

In an embodiment, the first antenna 810 (e.g., the NFC antenna) and the second antenna 820 (e.g., the patch antenna) may be disposed with a certain gap (G). The first antenna 810 (e.g., the NFC antenna) and the second antenna 820 (e.g., the patch antenna) may be disposed on different planes at different positions in a vertical direction (e.g., the z-axis direction). For example, the second antenna 820 (e.g., the patch antenna) may include a new radio (NR) band antenna for 5G communication or an ultra-wideband (UWB) antenna.

In an embodiment, the EMI shielding sheet 840 (e.g., the ferrite sheet) may be disposed to overlap with the first antenna 810 (e.g., the NFC antenna) in the vertical direction (e.g., the z-axis direction). The EMI shielding sheet 840 (e.g., the ferrite sheet) may not overlap with the second antenna 820 (e.g., the patch antenna).

In an embodiment, the heat dissipation sheet 850 may be disposed in the negative z-axis direction of the support member 830. For example, the heat dissipation sheet 850 may have a first area, and the EMI shielding sheet 840 (e.g., the ferrite sheet) may have a second area smaller than the first area. For example, the heat dissipation sheet 850 may be used as a ground (GND) of the second antenna 820 (e.g., the patch antenna).

In an embodiment, a first through-hole 803 may be formed to penetrate the support member 830, the EMI shielding sheet 840 (e.g., the ferrite sheet), and/or the heat dissipation sheet 850 in the vertical direction (e.g., the z-axis direction). In addition, a second through-hole 805 may be formed to penetrate the support member 830 and/or the heat dissipation sheet 850 in the vertical direction (e.g., the z-axis direction). For example, the first antenna 810 may be electrically connected to the printed circuit board 500 via the first through-hole 803 and through the first antenna contact part 860. In addition, the second antenna 820 (e.g., the patch antenna) may be electrically connected to the printed circuit board 500 via the second through-hole 805 and through the second antenna contact part 870.

The electronic device (e.g., the electronic device 200 in FIG. 2A, the electronic device 300 in FIG. 3A) according to various embodiments of the disclosure allows the second antenna 820 (e.g., the patch antenna) to be disposed in the space 801 inside the first antenna 810 (e.g., the NFC antenna), thus improving space efficiency. For example, the second antenna 820 may include a new radio (NR) band antenna for 5G communication or an ultra-wideband (UWB) antenna.

Figure 9:
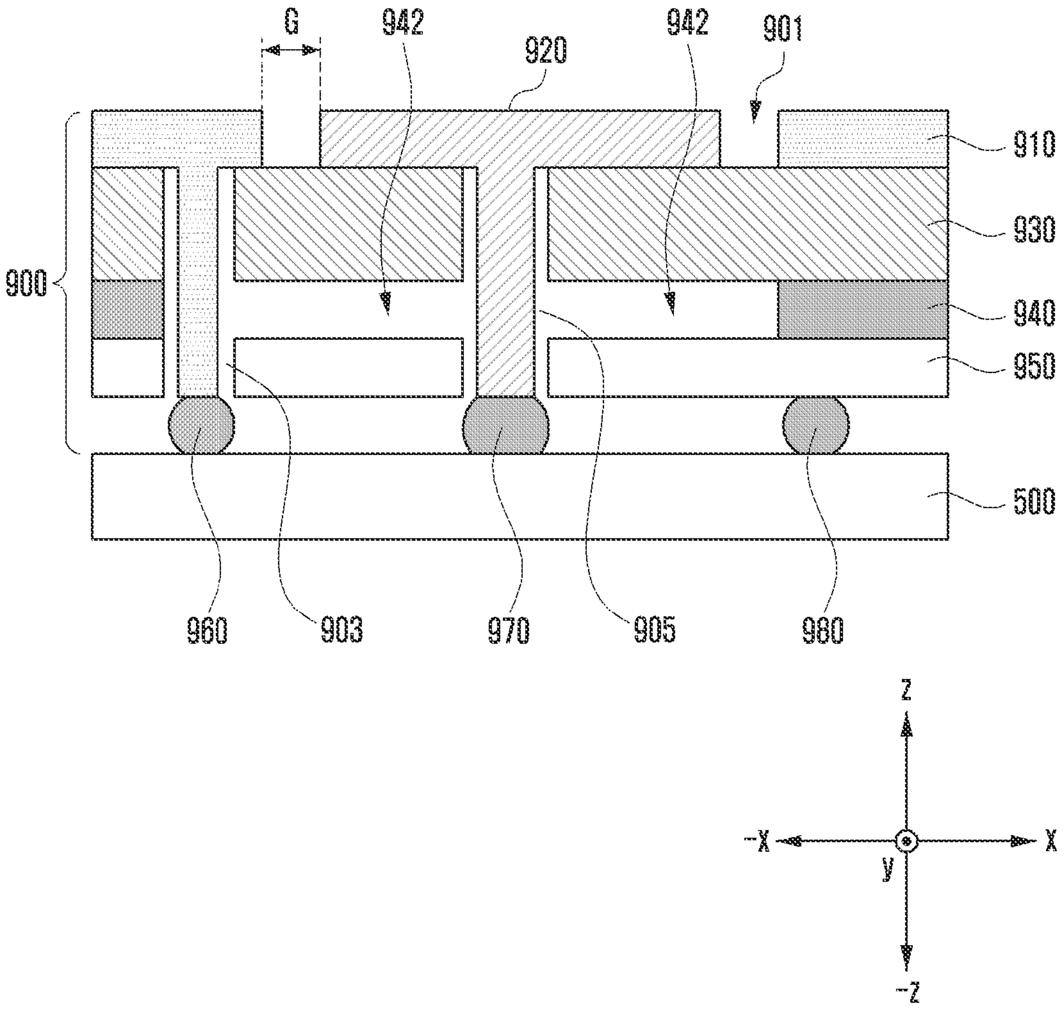
FIG. 9 is a diagram illustrating an antenna structure of an electronic device according to an embodiment of the disclosure.

FIG. 9 is a diagram illustrating an antenna structure of an electronic device according to an embodiment of the disclosure.

In describing the electronic device and an antenna structure 900 shown in FIG. 9, a detailed description of the same components as those of an electronic device and an antenna structure 800 shown in FIG. 8 may be omitted.

Referring to FIGS. 4A, 4B, and 9, an electronic device (e.g., the electronic device 200 in FIG. 2A, the electronic device 300 in FIG. 3A) according to various embodiments of the disclosure may include an antenna structure 900, a support member 930 (or a rear case), an electromagnetic interference (EMI) shielding sheet 940 (e.g., a ferrite sheet), a heat dissipation sheet 950, and a printed circuit board 500.

According to an embodiment, the antenna structure 900 may include a first antenna 910 (e.g., an NFC antenna), a second antenna 920 (e.g., a patch antenna), a first antenna contact part 960, a second antenna contact part 970, and/or a ground contact part 980.

According to an embodiment, the first antenna 910 (e.g., the NFC antenna) may be disposed in the form of a closed loop, and a space 901 may be formed inside the first antenna 910 (e.g., the NFC antenna). In an embodiment, the second antenna 920 (e.g., the patch antenna) may be disposed in the space 901 inside the first antenna 910 (e.g., the NFC antenna). The first antenna 910 (e.g., the NFC antenna) and the second antenna 920 (e.g., the patch antenna) may be disposed with a certain gap (G).

In an embodiment, the first antenna 910 (e.g., the NFC antenna) and the second antenna 920 (e.g., the patch antenna) may be positioned in the positive z-axis direction of the support member 930. The EMI shielding sheet 940 (e.g., the ferrite sheet) may be positioned in the negative z-axis direction of the support member 930.

In an embodiment, the EMI shielding sheet 940 (e.g., the ferrite sheet) may overlap with the first antenna 910 (e.g., the NFC antenna) in the vertical direction (e.g., the z-axis direction).

In an embodiment, at least partial region of the EMI shielding sheet 940 (e.g., the ferrite sheet) may be removed. The second antenna 920 (e.g., the patch antenna) may be disposed to overlap with a portion 942 from which the at least partial region of the EMI shielding sheet 940 (e.g., the ferrite sheet) is removed. For example, when viewed in the z-axis direction, the EMI shielding sheet 940 (e.g., the ferrite sheet) and the second antenna 920 (e.g., the patch antenna) may not overlap with each other.

In an embodiment, the first antenna 910 (e.g., the NFC antenna) and the second antenna 920 (e.g., the patch antenna) may be disposed with a certain gap (G). The first antenna 910 (e.g., the NFC antenna) and the second antenna 920 (e.g., the patch antenna) may be disposed on substantially the same plane in the vertical direction (e.g., the z-axis direction). For example, the second antenna 920 (e.g., the patch antenna) may include a new radio (NR) band antenna for 5G communication or an ultra-wideband (UWB) antenna.

In an embodiment, the heat dissipation sheet 950 may be disposed in the negative z-axis direction of the EMI shielding sheet 940 (e.g., the ferrite sheet).

In an embodiment, the heat dissipation sheet 950 may have a first area, and the EMI shielding sheet 940 (e.g., the ferrite sheet) may have a second area smaller than the first area. For example, the heat dissipation sheet 950 may be used as a ground (GND) of the second antenna 920 (e.g., the patch antenna).

In an embodiment, a first through-hole 903 may be formed to penetrate the support member 930, the EMI shielding sheet 940 (e.g., the ferrite sheet), and the heat dissipation sheet 950 in the vertical direction (e.g., the z-axis direction). In addition, a second through-hole 905 may be formed to penetrate the support member 930 and the heat dissipation sheet 950 in the vertical direction (e.g., the z-axis direction). For example, the first antenna 910 may be electrically connected to the printed circuit board 500 via the first through-hole 903 and through the first antenna contact part 960. In addition, the second antenna 920 (e.g., the patch antenna) may be electrically connected to the printed circuit board 500 via the second through-hole 905 and through the second antenna contact part 970.

The electronic device (e.g., the electronic device 200 in FIG. 2A, the electronic device 300 in FIG. 3A) according to various embodiments of the disclosure allows the second antenna 920 (e.g., the patch antenna) to be disposed in the space 901 inside the first antenna 910 (e.g., the NFC antenna), thus improving space efficiency. For example, the second antenna 920 may include a new radio (NR) band antenna for 5G communication or an ultra-wideband (UWB) antenna.

Figure 10A:
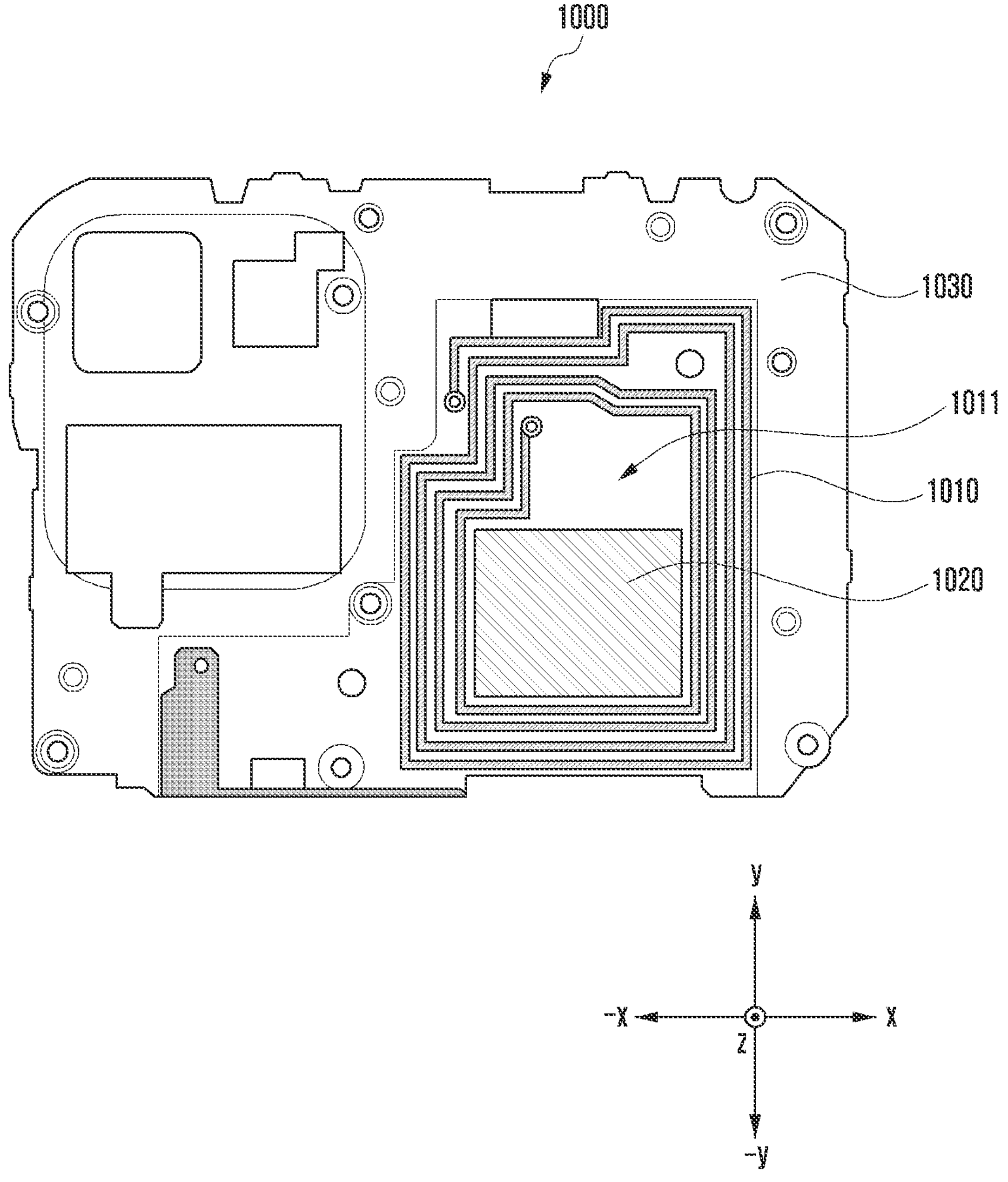
FIG. 10A is a diagram illustrating an antenna structure of an electronic device, when viewed from a first direction (e.g., a front surface), according to an embodiment of the disclosure.
Figure 10B:
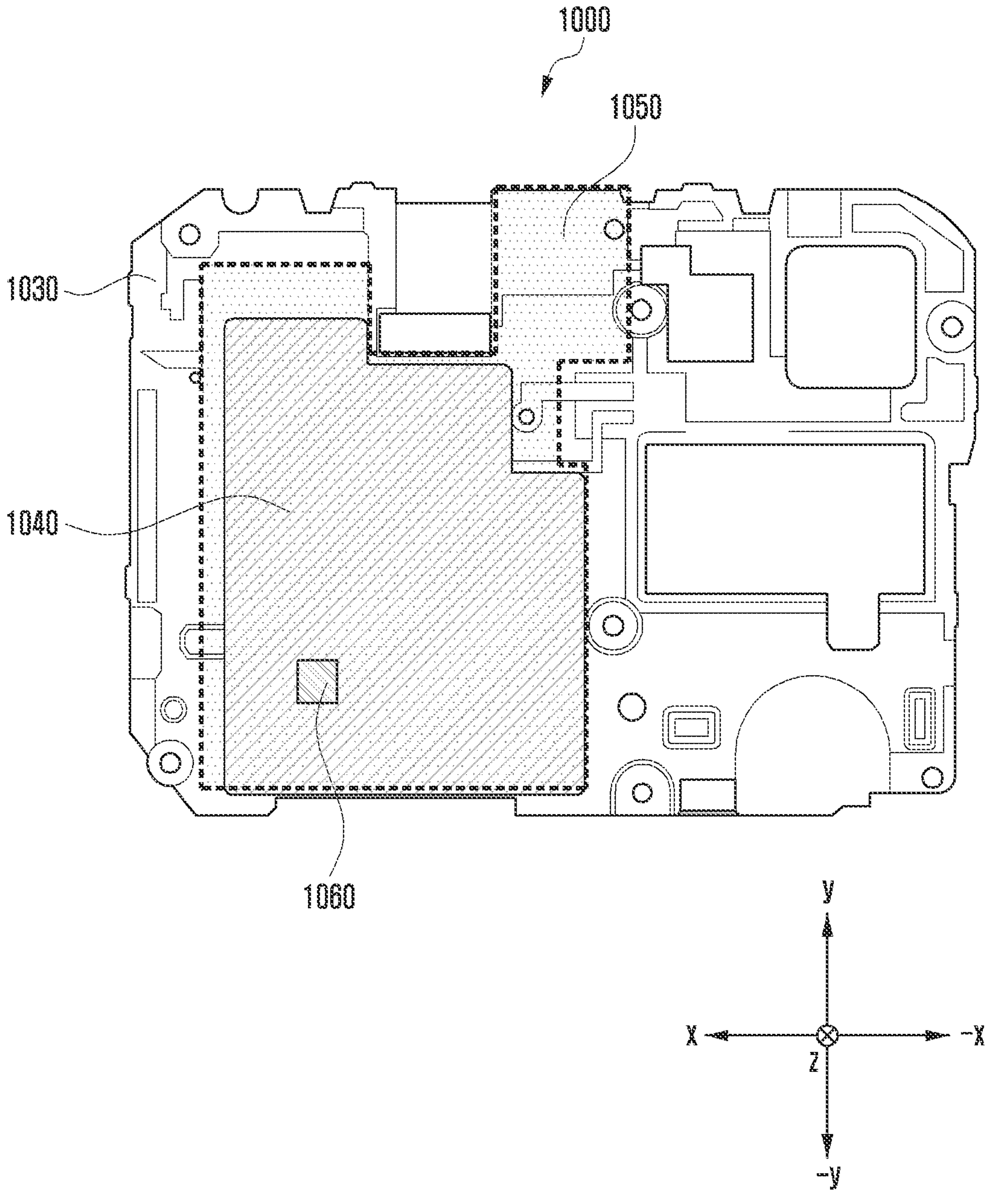
FIG. 10B is a diagram illustrating an antenna structure of an electronic device, viewed from a second direction (e.g., a rear surface), according to an embodiment of the disclosure.
Figure 11:
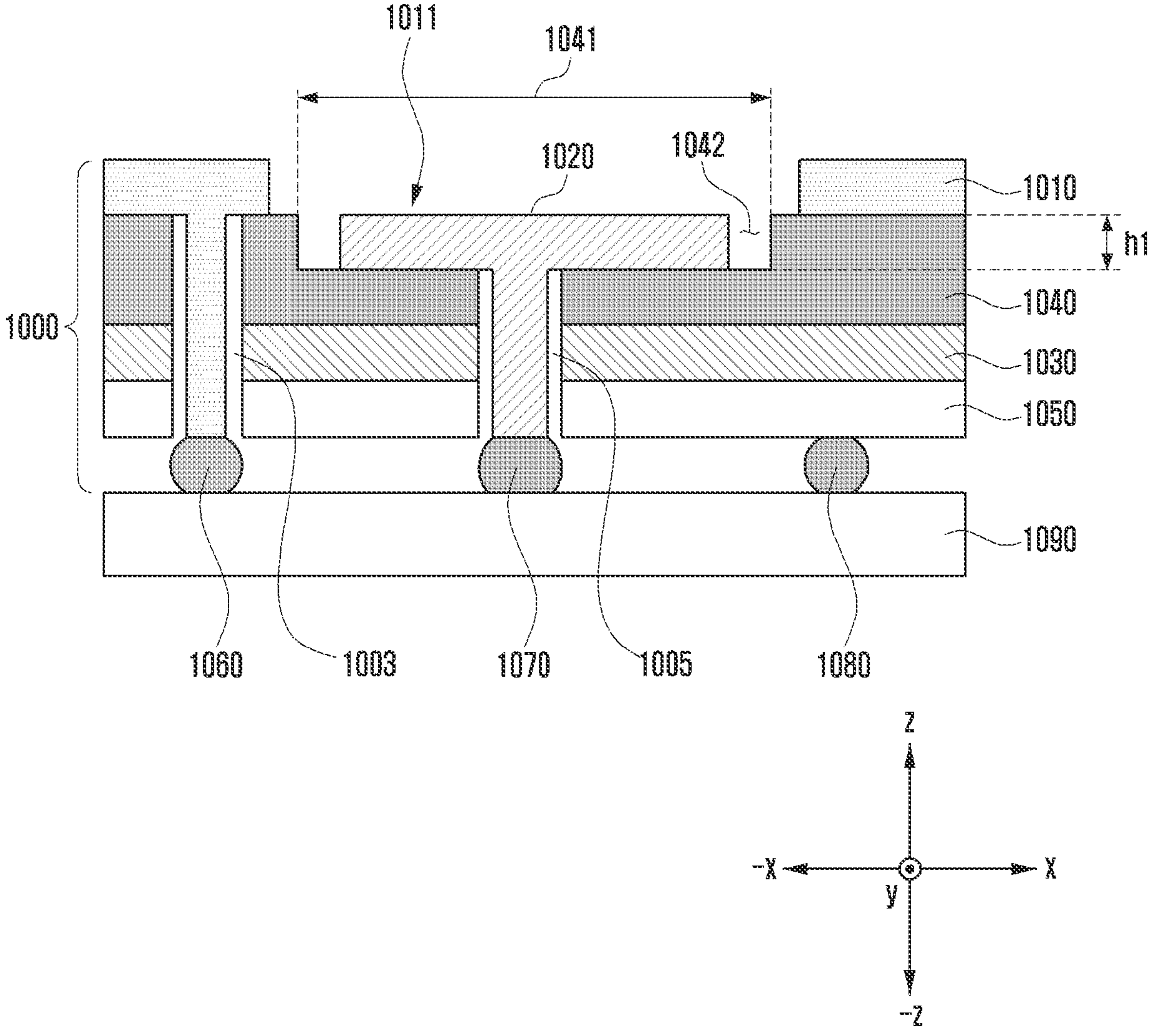
FIG. 11 is a cross-sectional view of the antenna structure shown in FIG. 10A according to an embodiment of the disclosure.

FIG. 10A is a diagram illustrating an antenna structure of an electronic device, when viewed from a first direction (e.g., the positive z-axis direction), according to an embodiment of the disclosure. FIG. 10B is a diagram illustrating an antenna structure of an electronic device, viewed from a second direction (e.g., the negative z-axis direction), according to an embodiment of the disclosure. FIG. 11 is a cross-sectional view of an antenna structure shown in FIG. 10A according to an embodiment of the disclosure.

Referring to FIGS. 10A, 10B, and 11, an electronic device (e.g., the electronic device 200 in FIG. 2A, the electronic device 300 in FIG. 3A) according to various embodiments of the disclosure may include an antenna structure 1000, a support member 1030 (e.g., an antenna carrier, a housing), an electromagnetic interference (EMI) shielding sheet 1040 (e.g., a ferrite sheet), a heat dissipation sheet 1050, and/or a printed circuit board 1090.

In an embodiment, the antenna structure 1000 may be disposed on the support member 1030 of the electronic device (e.g., the electronic device 200 in FIG. 2A, the electronic device 300 in FIG. 3A). The antenna structure 1000 may include a first antenna 1010 (e.g., a near field communication (NFC) antenna), a second antenna 1020 (e.g., a patch antenna), a first antenna contact part 1060, a second antenna contact part 1070, and/or a ground contact part 1080.

According to an embodiment, the first antenna 1010 (e.g., the NFC antenna) may be disposed in the form of a closed loop, and a space 1011 may be formed inside the first antenna 1010 (e.g., the NFC antenna). For example, the space 1011 formed inside the loop-formed first antenna 1010 (e.g., the NFC antenna) may be an area surrounded by a radiator of the first antenna 1010 (e.g., the NFC antenna).

In an embodiment, the second antenna 1020 (e.g., the patch antenna) may be disposed in the space 1011 surrounded by the radiator of the first antenna 1010 (e.g., the NFC antenna). The first antenna 1010 (e.g., the NFC antenna) and the second antenna 1020 (e.g., the patch antenna) may be disposed with a certain gap.

In an embodiment, the first antenna 1010 (e.g., the NFC antenna) and the second antenna 1020 (e.g., the patch antenna) may be disposed on one surface (e.g., a first surface such as the first surface 431 in FIG. 4A) facing the z-axis direction of the EMI shielding sheet 1040 (e.g., the ferrite sheet).

In an example, a portion 1041 of the EMI shielding sheet 1040 (e.g., the ferrite sheet) may be formed as low as a first height (h1). For example, the portion 1041 of the EMI shielding sheet 1040 (e.g., the ferrite sheet) may be located within the space 1011 formed inside the first antenna 1010 (e.g., the NFC antenna). The second antenna 1020 (e.g., the patch antenna) may be disposed on a stepped portion 1042 of the EMI shielding sheet 1040 (e.g., the ferrite sheet) having a lowered height. For example, the first antenna 1010 (e.g., the NFC antenna) may be disposed at a higher position than the second antenna 1020 (e.g., the patch antenna). In an example, the first antenna 1010 may be disposed to overlap with a first portion of the EMI shielding sheet 1040 having a first height. The second antenna 1020 may be disposed to overlap with a second portion (e.g., the stepped portion 1042) of the EMI shielding sheet 1040 having a second height lower than the first height.

In an embodiment, when viewed in the z-axis direction, the EMI shielding sheet 1040 (e.g., the ferrite sheet) may be disposed to overlap with the first antenna 1010 (e.g., the NFC antenna) and the second antenna 1020 (e.g., the patch antenna). For example, the second antenna 1020 (e.g., the patch antenna) may include an antenna (e.g., a new radio (NR) band antenna for 5G communication or a ultra-wideband (UWB) antenna) for a frequency band different from that of the first antenna 1010.

In an embodiment, the support member 1030 may be disposed in the negative z-axis direction of the EMI shielding sheet 1040 (e.g., the ferrite sheet).

In an embodiment, the heat dissipation sheet 1050 may be disposed in the negative z-axis direction of the support member 1030. For example, the heat dissipation sheet 1050 may have a first area, and the EMI shielding sheet 1040 (e.g., the ferrite sheet) may have a second area smaller than the first area. For example, the heat dissipation sheet 1050 may be electrically connected to a ground terminal of the printed circuit board 1090 through the ground contact part 1080. The heat dissipation sheet 1050 may be used as a ground (GND) of the second antenna 1020 (e.g., the patch antenna). In another embodiment, the heat dissipation sheet 1050 may be omitted from the electronic device. In this case, the EMI shielding sheet 1040 (e.g., the ferrite sheet) may be used as the ground (GND) of the second antenna 1020 (e.g., the patch antenna).

In an embodiment, the printed circuit board 1090 may be disposed in the negative z-axis direction of the heat dissipation sheet 1050. For example, the heat dissipation sheet 1050 may be positioned between the support member 1030 and the printed circuit board 1090. In an embodiment, the printed circuit board 1090 may include a wireless communication module (e.g., the wireless communication module in FIG. 1) for operating the first antenna 1010 (e.g., the NFC antenna) and the second antenna 1020 (e.g., the patch antenna).

In an embodiment, a first through-hole 1003 and/or a second through-hole 1005 may be formed to penetrate the support member 1030, the EMI shielding sheet 1040 (e.g., the ferrite sheet), and the heat dissipation sheet 1050 in the z-axis direction. For example, the first antenna 1010 may be electrically connected to the printed circuit board 1090 via the first through-hole 1003 and through the first antenna contact part 1060. In addition, the second antenna 1020 (e.g., the patch antenna) may be electrically connected to the printed circuit board 1090 via the second through-hole 1005 and through the second antenna contact part 1070.

In case of an electronic device that supports various communication schemes including 5G communication, it may be difficult to arrange an antenna due to a narrow internal space. The electronic device (e.g., the electronic device 200 in FIG. 2A, the electronic device 300 in FIG. 3A) according to various embodiments of the disclosure allows the second antenna 1020 (e.g., the patch antenna) for a different frequency band to be disposed in the space 1011 inside the first antenna 1010 (e.g., the NFC antenna), thus improving space efficiency.

According to various embodiments of the disclosure, an electronic device (e.g., the electronic device 101 in FIG. 1, the electronic device 200 in FIGS. 2A and 2B, or the electronic device 300 in FIGS. 3A and 3B) may include a housing (e.g., the support member 430 in FIGS. 4A and 4B, or the support member 1030 in FIGS. 10A and 10B) having a front surface and a rear surface, a first antenna (e.g., the first antenna 410 in FIG. 5A, the first antenna 810 in FIG. 8, the first antenna 910 in FIG. 9, or the first antenna 1010 in FIG. 11), a second antenna (e.g., the second antenna 420 in FIG. 5A, the second antenna 820 in FIG. 8, the second antenna 920 in FIG. 9, or the second antenna 1020 in FIG. 11), a printed circuit board (e.g., the printed circuit board 500 in FIG. 5A, or the printed circuit board 1090 in FIG. 11), and an electromagnetic interference (EMI) shielding sheet (e.g., the EMI shielding sheet 440 in FIG. 5A, the EMI shielding sheet 840 in FIG. 8, the EMI shielding sheet 940 in FIG. 9, or the EMI shielding sheet 1040 in FIG. 11). The first antenna 410, 810, 910, or 1010 may be disposed inside the housing (e.g., the support member 430 in FIGS. 4A and 4B, or the support member 1030 in FIGS. 10A and 10B). The second antenna 420, 820, 920, or 1020 may be disposed in an area surrounded by a radiator of the first antenna 410, 810, 910, or 1010 when viewed from above the rear surface. The printed circuit board 500 or 1090 may include a wireless communication module (e.g., the wireless communication module 192 in FIG. 1) for operating the first antenna 410, 810, 910, or 1010 and the second antenna 420, 820, 920, or 1020, and may be electrically connected to the first antenna 410, 810, 910, or 1010 and the second antenna 420, 820, 920, or 1020. The first antenna 410, 810, 910, or 1010 may be positioned between the rear surface and the EMI shielding sheet 440, 840, 940, or 1040.

According to an embodiment, the first antenna 410, 810, 910, or 1010 and the second antenna 420, 820, 920, or 1020 may be disposed with a predetermined gap on a substantially same plane.

According to an embodiment, the first antenna 410, 810, 910, or 1010 and the second antenna 420, 820, 920, or 1020 may be disposed with a predetermined gap on different planes.

According to an embodiment, the first antenna 410, 810, 910, or 1010 may include a near field communication (NFC) antenna.

According to an embodiment, the second antenna 420, 820, 920, or 1020 may include a new radio (NR) band antenna and/or an ultra-wideband (UWB) antenna.

According to an embodiment, the EMI shielding sheet 440, 840, 940, or 1040 may be disposed to overlap with at least a portion of the first antenna 410, 810, 910, or 1010.

According to an embodiment, the EMI shielding sheet 440, 840, 940, or 1040 may be disposed to overlap with at least a portion of the second antenna 420, 820, 920, or 1020.

According to an embodiment, the EMI shielding sheet 440, 840, 940, or 1040 may be removed at least in part (e.g., the partial region 444 in FIG. 6B) to have an empty space.

According to an embodiment, at least a portion of the second antenna 420, 820, 920, or 1020 may be disposed to overlap with the empty space.

According to an embodiment, the second antenna 420, 820, 920, or 1020 may be disposed in the empty space, and the second antenna 420, 820, 920, or 1020 and the EMI shielding sheet 440, 840, 940, or 1040 may be disposed on a substantially same plane.

According to an embodiment, the EMI shielding sheet 440, 840, 940, or 1040 may include a first portion having a first height and a second portion having a second height lower than the first height.

According to an embodiment, the first antenna 410, 810, 910, or 1010 may be disposed to overlap with the first portion of the EMI shielding sheet 440, 840, 940, or 1040.

According to an embodiment, the second antenna 420, 820, 920, or 1020 may be disposed to overlap with the second portion of the EMI shielding sheet 440, 840, 940, or 1040.

According to an embodiment, the electronic device may further include a heat dissipation sheet (e.g., the heat dissipation sheet 450 in FIG. 5A, the heat dissipation sheet 850 in FIG. 8, the heat dissipation sheet 950 in FIG. 9, or the heat dissipation sheet 1050 in FIG. 11) disposed under the first antenna 410, 810, 910, or 1010 and the second antenna 420, 820, 920, or 1020.

According to an embodiment, the EMI shielding sheet 440, 840, 940, or 1040 may be positioned between the housing (e.g., the support member 430 in FIGS. 4A and 4B, or the support member 1030 in FIGS. 10A and 10B) and the heat dissipation sheet 450, 850, 950, or 1050.

According to an embodiment, the housing (e.g., the support member 430 in FIGS. 4A and 4B, or the support member 1030 in FIGS. 10A and 10B) may be positioned between the EMI shielding sheet 440, 840, 940, or 1040 and the heat dissipation sheet 450, 850, 950, or 1050.

According to an embodiment, the electronic device may further include a ground contact part (e.g., the ground contact part 480 in FIG. 5A, the ground contact part 880 in FIG. 8, the ground contact part 980 in FIG. 9, or the ground contact part 1080 in FIG. 11) electrically connected to a ground terminal of the printed circuit board 500 or 1090. The heat dissipation sheet 450, 850, 950, or 1050 may be electrically connected to the ground contact part 480, 880, 980, or 1080.

According to an embodiment, the heat dissipation sheet 450, 850, 950, or 1050 may be used as a ground of the second antenna 420, 820, 920, or 1020.

According to an embodiment, a first through-hole (e.g., the first through-hole 403 in FIG. 5A, the first through-hole 803 in FIG. 8, the first through-hole 903 in FIG. 9, or the first through-hole 1003 in FIG. 11) penetrating the EMI shielding sheet 440, 840, 940, or 1040, the housing (e.g., the support member 430 in FIGS. 4A and 4B, or the support member 1030 in FIGS. 10A and 10B), and the heat dissipation sheet 450, 850, 950, or 1050 may be formed. A first antenna contact part (e.g., the first antenna contact part 460 in FIG. 5A, the first antenna contact part 860 in FIG. 8, the first antenna contact part 960 in FIG. 9, or the first antenna contact part 1060 in FIG. 11) electrically connecting the first antenna 410, 810, 910, or 1010 to the printed circuit board 500 or 1090 may be included. The first antenna 410, 810, 910, or 1010 and the printed circuit board 500 or 1090 may be electrically connected through the first through-hole 403, 803, 903, or 1003 and the first antenna contact part 460, 860, 960, or 1060.

According to an embodiment, a second through-hole (e.g., the second through-hole 405 in FIG. 5A, the second through-hole 805 in FIG. 8, the second through-hole 905 in FIG. 9, or the second through-hole 1005 in FIG. 11) penetrating the EMI shielding sheet 440, 840, 940, or 1040, the housing (e.g., the support member 430 in FIGS. 4A and 4B, or the support member 1030 in FIGS. 10A and 10B), and the heat dissipation sheet 450, 850, 950, or 1050 may be formed. A second antenna contact part (e.g., the second antenna contact part 470 in FIG. 5A, the second antenna contact part 870 in FIG. 8, the second antenna contact part 970 in FIG. 9, or the second antenna contact part 1070 in FIG. 11) electrically connecting the second antenna 420, 820, 920, or 1020 to the printed circuit board 500 or 1090 may be included. The second antenna 420, 820, 920, or 1020 and the printed circuit board 500 or 1090 may be electrically connected through the second through-hole 405, 805, 905, or 1005 and the second antenna contact part 470, 870, 970, or 1070.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:

a housing having a front surface and a rear surface;

a first antenna disposed in a loop form inside the housing;

a second antenna disposed in an area surrounded by a radiator of the first antenna when viewed from above the rear surface;

a printed circuit board comprising wireless communication circuitry for operating the first antenna and the second antenna, and electrically connected to the first antenna and the second antenna;

an electromagnetic interference (EMI) shielding sheet; and a heat dissipation sheet disposed under the first antenna and the second antenna, wherein at least one through-hole is formed penetrating the EMI shielding sheet and the heat dissipation sheet to allow the electrical connection between the first antenna and the printed circuit board and the electrical connection between the second antenna and the printed circuit board, wherein the first antenna is positioned between the rear surface and the EMI shielding sheet.

2. The electronic device of claim 1, wherein the first antenna and the second antenna are disposed, apart by a predetermined gap, on a substantially same plane.

3. The electronic device of claim 1, wherein the first antenna and the second antenna are disposed, apart by a predetermined gap, on different planes.

4. The electronic device of claim 1, wherein the first antenna comprises a near field communication (NFC) antenna.

5. The electronic device of claim 1, wherein the second antenna comprises a new radio (NR) band antenna and/or an ultra-wideband (UWB) antenna.

6. The electronic device of claim 1, wherein the EMI shielding sheet is disposed to overlap with at least a portion of the first antenna.

7. The electronic device of claim 1, wherein the EMI shielding sheet is disposed to overlap with at least a portion of the second antenna.

8. The electronic device of claim 1, wherein the EMI shielding sheet is removed at least in part to have an empty space.

9. The electronic device of claim 8, wherein at least a portion of the second antenna is disposed to overlap with the empty space.

10. The electronic device of claim 8, wherein the second antenna is disposed in the empty space, and wherein the second antenna and the EMI shielding sheet are disposed on a substantially same plane.

11. The electronic device of claim 1, wherein the EMI shielding sheet comprises a first portion having a first height and a second portion having a second height lower than the first height.

12. The electronic device of claim 11, wherein the first antenna is disposed to overlap with the first portion of the EMI shielding sheet.

13. The electronic device of claim 11, wherein the second antenna is disposed to overlap with the second portion of the EMI shielding sheet.

14. The electronic device of claim 1, wherein the EMI shielding sheet is positioned between the housing and the heat dissipation sheet.

15. The electronic device of claim 1, wherein the housing is positioned between the EMI shielding sheet and the heat dissipation sheet.

16. The electronic device of claim 1, further comprising:

a ground contact part electrically connected to a ground terminal of the printed circuit board, wherein the heat dissipation sheet is electrically connected to the ground contact part.

17. The electronic device of claim 16, wherein the heat dissipation sheet is used as a ground of the second antenna.

18. The electronic device of claim 16, wherein the at least one through-hole includes a first through-hole, wherein a first antenna contact part electrically connecting the first antenna to the printed circuit board is included, and wherein the first antenna and the printed circuit board are electrically connected through the first through-hole and the first antenna contact part.

19. The electronic device of claim 16, wherein the at least one through-hole includes a second through-hole, wherein a second antenna contact part electrically connecting the second antenna to the printed circuit board is included, and wherein the second antenna and the printed circuit board are electrically connected through the second through-hole and the second antenna contact part.

* * * * *